(12) United States Patent
Hardy et al.

(10) Patent No.: US 8,356,789 B2
(45) Date of Patent: Jan. 22, 2013

(54) UNIVERSAL ACCESSORY MOUNTING SYSTEM FOR GOLF CARS AND UTILITY VEHICLES

(75) Inventors: David R. Hardy, Hephzibah, GA (US); Gary L. Lewis, Evans, GA (US); Duane E. Newman, Evans, GA (US); Geoff D. Stewart, Evans, GA (US)

(73) Assignee: Club Car, Inc., Evans, GA (US)

( * ) Notice: Subject to any disclaimer, the term of this patent is extended or adjusted under 35 U.S.C. 154(b) by 25 days.

(21) Appl. No.: 12/684,641

(22) Filed: Jan. 8, 2010

(65) Prior Publication Data

US 2010/0133308 A1 Jun. 3, 2010

Related U.S. Application Data

(63) Continuation of application No. 11/048,471, filed on Jan. 31, 2005, now Pat. No. 7,669,828.

(60) Provisional application No. 60/540,181, filed on Jan. 29, 2004.

(51) Int. Cl.
*F16M 13/00* (2006.01)

(52) U.S. Cl. ............... 248/558; 248/200; 248/309.1; 224/274; 224/547; 224/557

(58) Field of Classification Search ............ 248/200, 248/205.1, 207, 213.2, 223.41, 220.21, 224.7, 248/309.1, 558; 224/274, 545, 546, 547, 224/555, 557, 558
See application file for complete search history.

(56) References Cited

U.S. PATENT DOCUMENTS

| | | | |
|---|---|---|---|
| 2,732,159 A * | 1/1956 | Connors et al. ........... 248/224.51 |
| 2,939,364 A * | 6/1960 | Doswell et al. ............... 248/478 |
| 3,269,683 A | 8/1966 | Shinaver |
| 3,337,172 A * | 8/1967 | Jackson ................... 248/222.51 |
| 3,606,229 A | 9/1971 | Patton |
| 4,176,580 A * | 12/1979 | Gallegos ........................ 84/327 |
| 4,308,961 A * | 1/1982 | Kunce ........................ 211/94.01 |
| 4,355,746 A | 10/1982 | Casady |
| 4,533,013 A | 8/1985 | Hightower |
| 4,620,736 A * | 11/1986 | Shanks ......................... 239/116 |
| 4,645,167 A | 2/1987 | Hardwick |
| 4,930,591 A | 6/1990 | Lanius et al. |
| 5,035,389 A * | 7/1991 | Wang ....................... 248/224.51 |
| 5,052,604 A * | 10/1991 | Tourangeau ................. 224/274 |
| 5,086,958 A * | 2/1992 | Nagy ............................. 224/544 |
| 5,105,958 A | 4/1992 | Patton |
| 5,178,353 A * | 1/1993 | Huxtable ................. 248/222.52 |
| 5,180,089 A | 1/1993 | Suman et al. |
| 5,282,554 A | 2/1994 | Thomas |
| 5,356,061 A | 10/1994 | Yu |
| 5,411,237 A | 5/1995 | Dougherty |
| 5,417,395 A * | 5/1995 | Fowler et al. ............ 248/222.11 |
| 5,474,273 A | 12/1995 | Vinal |

(Continued)

*Primary Examiner* — Terrell McKinnon
*Assistant Examiner* — Monica Millner
(74) *Attorney, Agent, or Firm* — Michael Best & Friedrich LLP

(57) ABSTRACT

A golf accessory for attaching to an accessory mounting system of a golf car. The accessory mounting system including a bracket that is configured to connectably receive the golf accessory and a mount for attachment to the golf car and configured to connectably receive the bracket. The mount including a base that has a generally vertical surface, an aperture extending generally horizontally into the base from the vertical surface and configured to receive a portion of a fastener coupled with the bracket, and a slotted opening extending into the base and configured to receive a portion of the bracket. The base including a generally horizontal surface and the slotted opening extends generally vertically into the base from the horizontal surface. The golf accessory including a golf-related item, and means for connecting the golf-related item to the bracket.

21 Claims, 19 Drawing Sheets

U.S. PATENT DOCUMENTS

| | | | |
|---|---|---|---|
| 5,480,078 A | 1/1996 | Verrette et al. | |
| 5,573,164 A * | 11/1996 | Law | 224/483 |
| 5,599,037 A | 2/1997 | Spickler | |
| 5,674,046 A | 10/1997 | Meyer | |
| 5,687,443 A | 11/1997 | Moore | |
| 5,820,093 A | 10/1998 | Murray | |
| 5,829,723 A * | 11/1998 | Brunner et al. | 248/222.13 |
| 5,842,535 A | 12/1998 | Dennis | |
| 5,950,617 A | 9/1999 | Lorenz | |
| 5,975,549 A | 11/1999 | Ockenden | |
| 5,979,724 A | 11/1999 | Loewenthal et al. | |
| 6,079,600 A | 6/2000 | Linker et al. | |
| 6,227,505 B1 | 5/2001 | Van Order et al. | |
| 6,227,556 B1 * | 5/2001 | Ockenden | 280/204 |
| 6,318,687 B2 | 11/2001 | Trana et al. | |
| 6,394,555 B2 * | 5/2002 | Mizuta et al. | 298/38 |
| 6,422,651 B1 | 7/2002 | Muhlberger et al. | |
| 6,457,618 B1 | 10/2002 | Hancock et al. | |
| 6,481,679 B1 * | 11/2002 | Bennett et al. | 248/224.51 |
| 6,592,093 B2 | 7/2003 | Valentz | |
| D482,261 S | 11/2003 | Kobayashi | |
| 6,808,231 B1 | 10/2004 | Hill | |
| 6,892,992 B2 | 5/2005 | Donahue | |
| 6,986,446 B2 * | 1/2006 | Murray et al. | 224/275 |
| 7,044,344 B2 * | 5/2006 | Winkler | 224/274 |
| D528,539 S | 9/2006 | McClaude | |
| 7,377,570 B2 * | 5/2008 | Rondeau et al. | 296/65.03 |
| 7,578,489 B1 * | 8/2009 | Lee | 248/223.41 |
| 7,802,766 B2 * | 9/2010 | Thompson | 248/220.1 |
| 2002/0145095 A1 | 10/2002 | Winkler | |
| 2003/0062456 A1 | 4/2003 | Nakagawa et al. | |
| 2004/0108348 A1 | 6/2004 | Barnes | |
| 2004/0112774 A1 * | 6/2004 | Winkler | 206/315.2 |
| 2004/0124317 A1 | 7/2004 | Wallaker | |
| 2005/0048348 A1 | 3/2005 | Bazzarella | |
| 2005/0121483 A1 | 6/2005 | Barnes | |
| 2005/0242255 A1 | 11/2005 | Sturt et al. | |
| 2005/0274763 A1 * | 12/2005 | Hansen | 224/547 |
| 2007/0057526 A1 * | 3/2007 | Bigelow et al. | 296/65.03 |
| 2009/0189381 A1 * | 7/2009 | Kirtland | 280/769 |
| 2010/0108837 A1 * | 5/2010 | Felton | 248/221.11 |

* cited by examiner

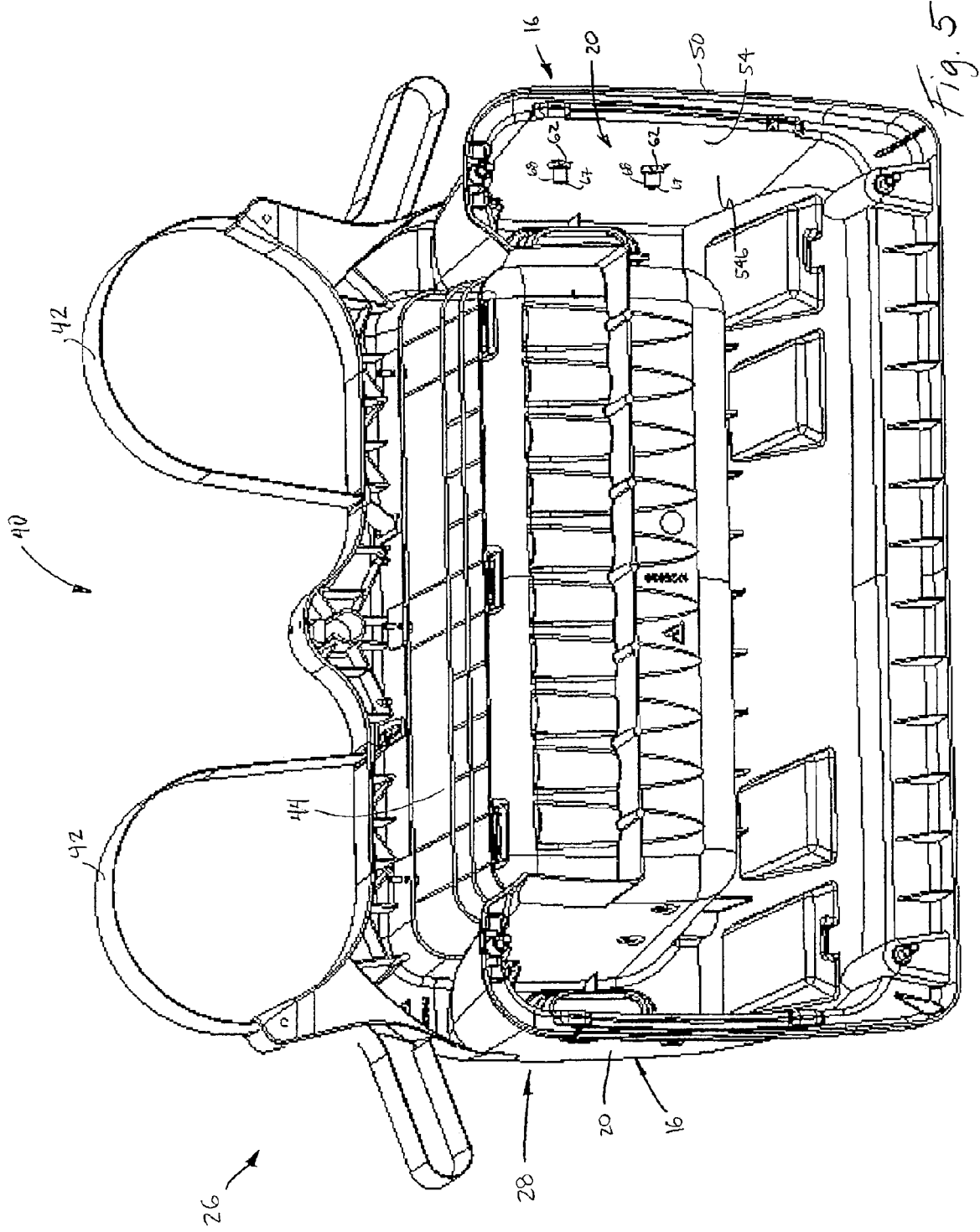

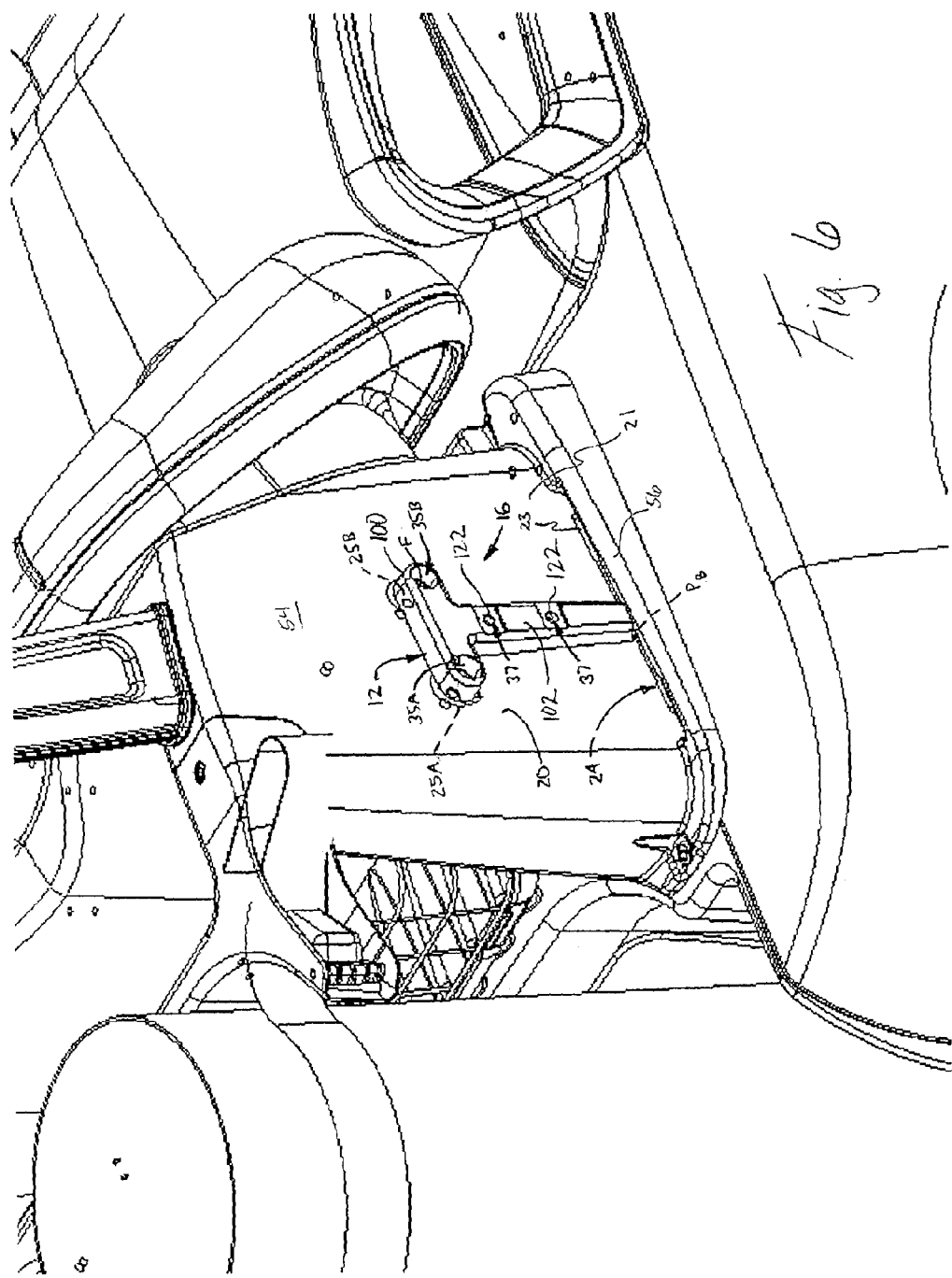

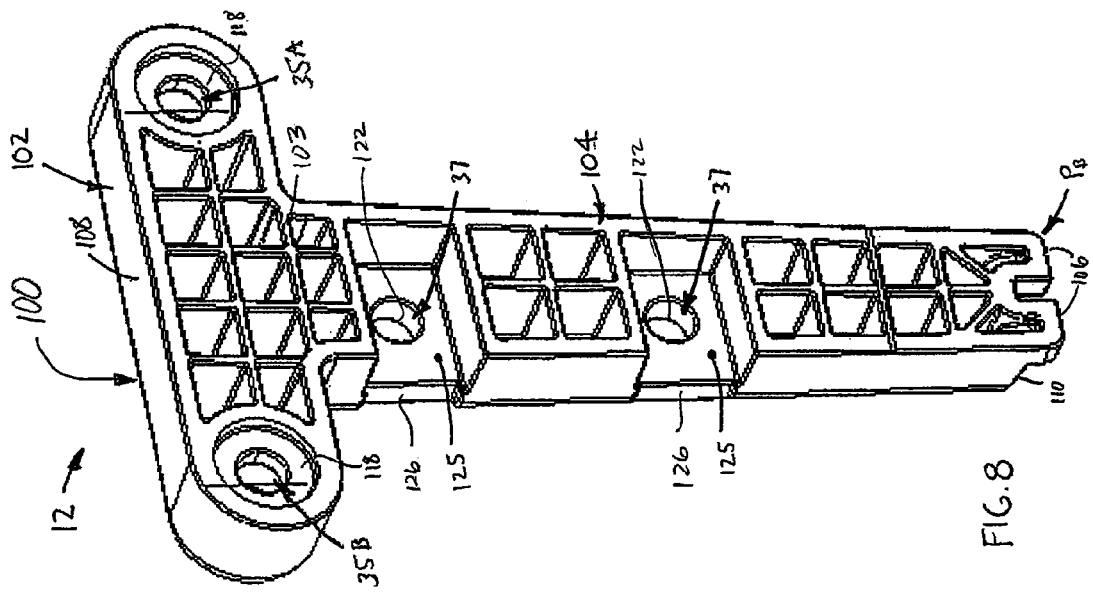
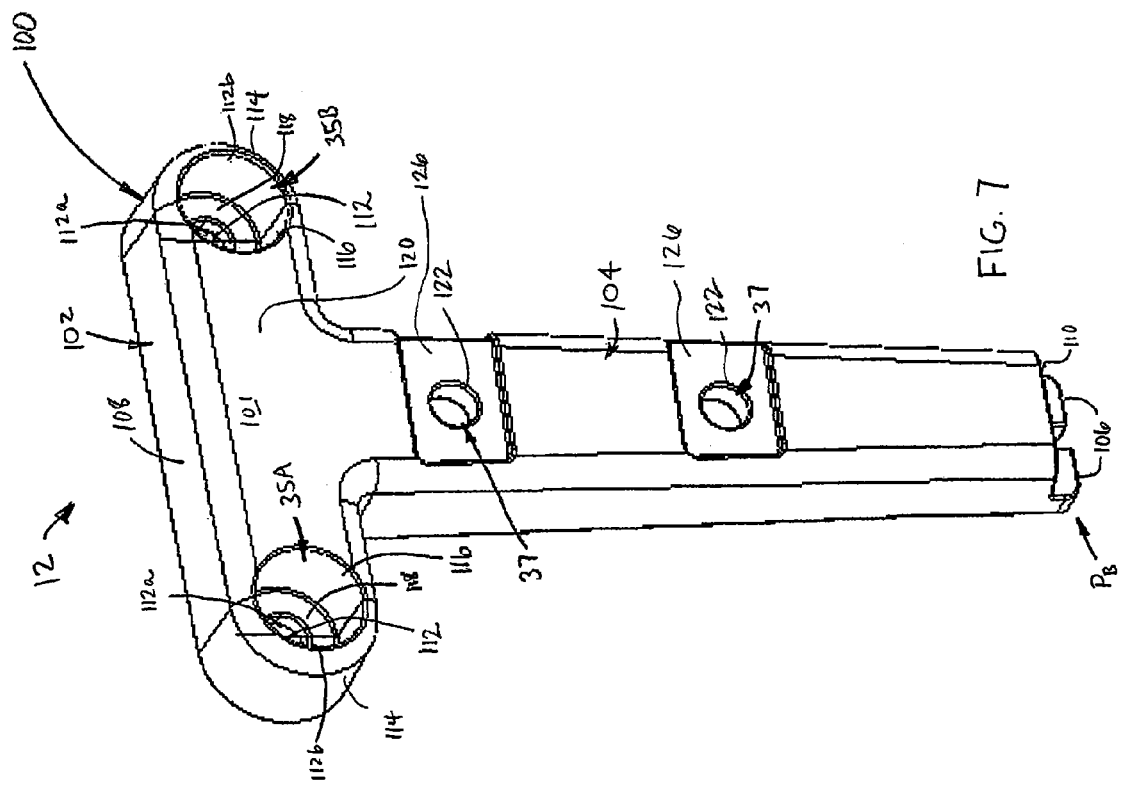

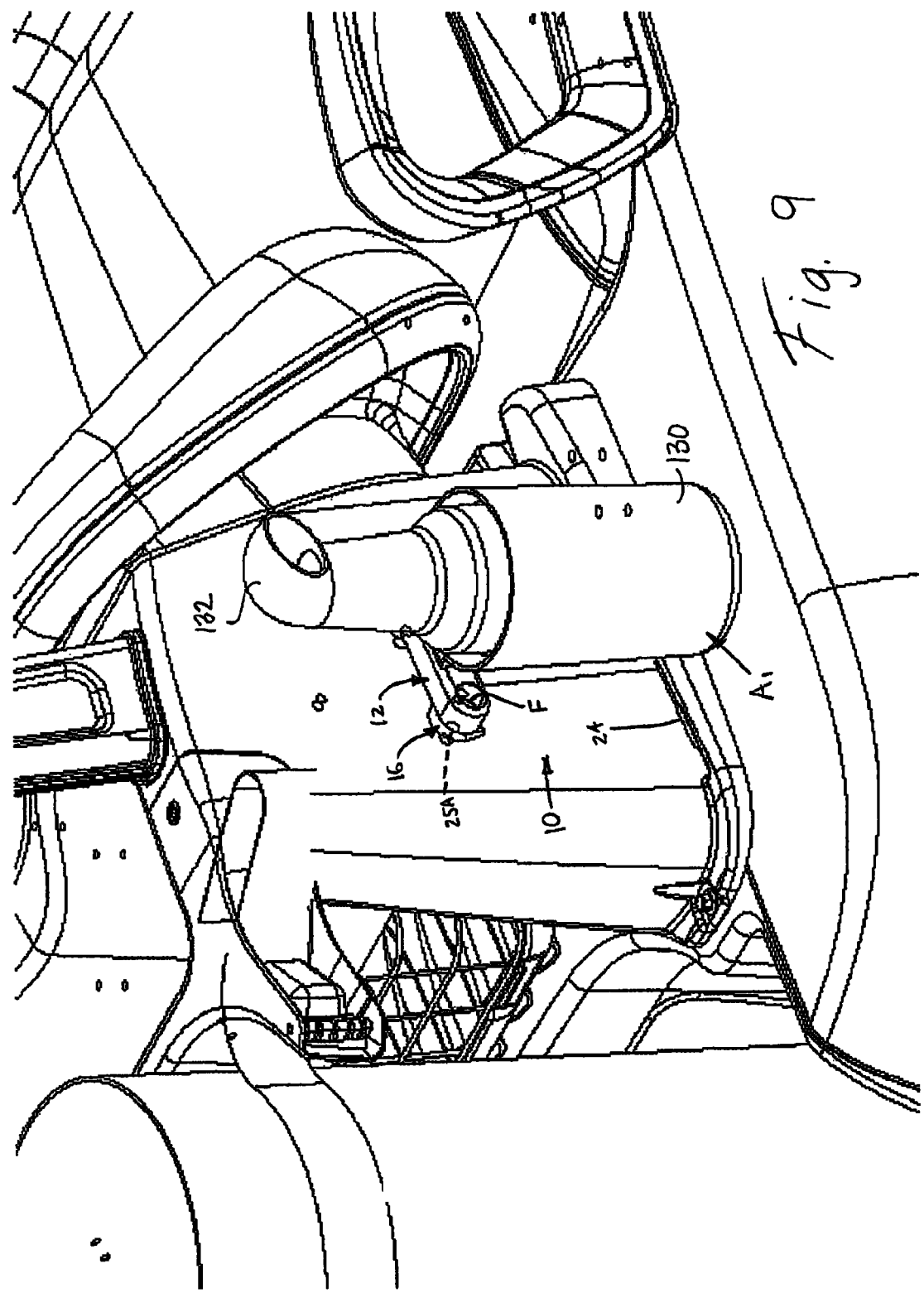

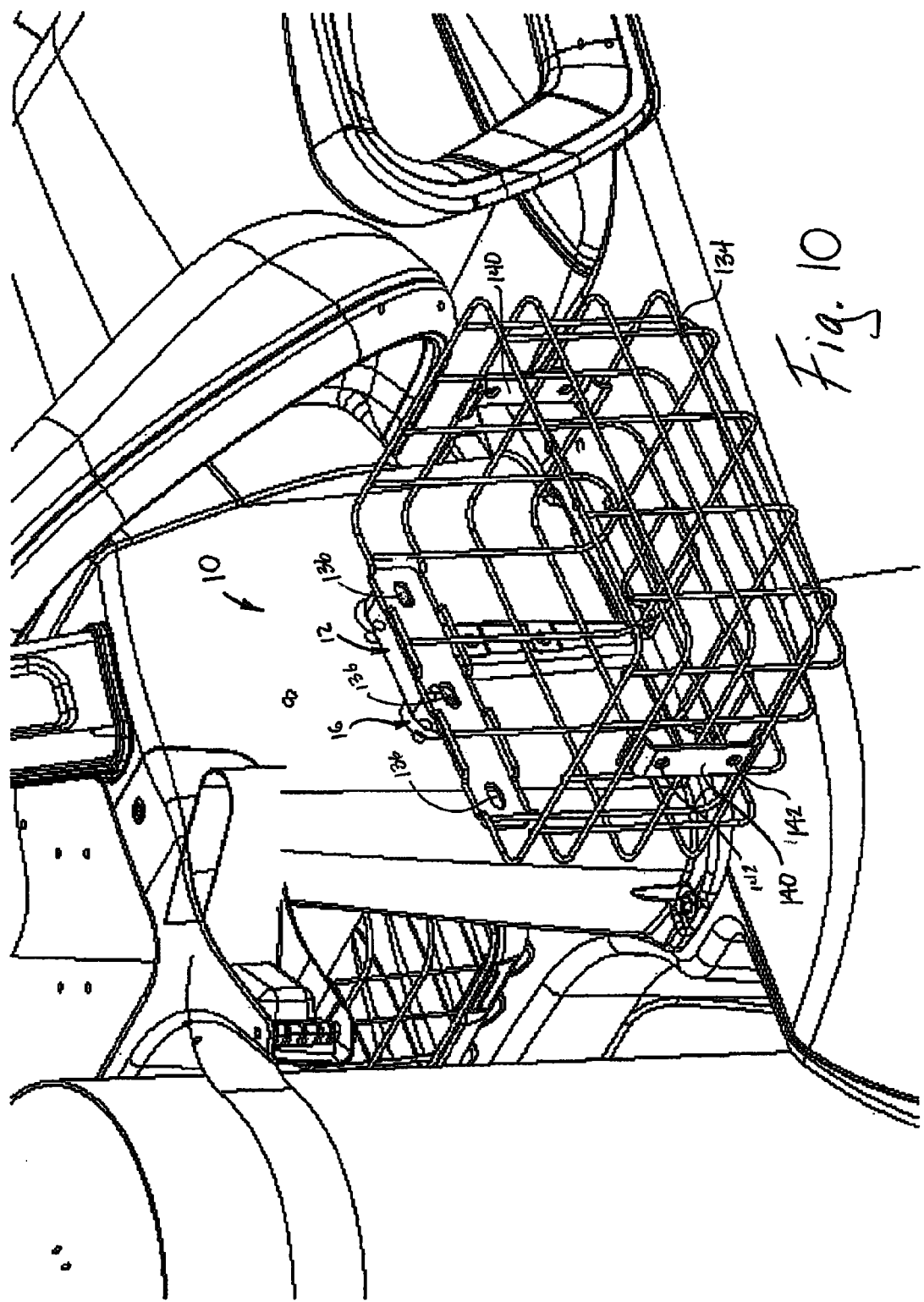

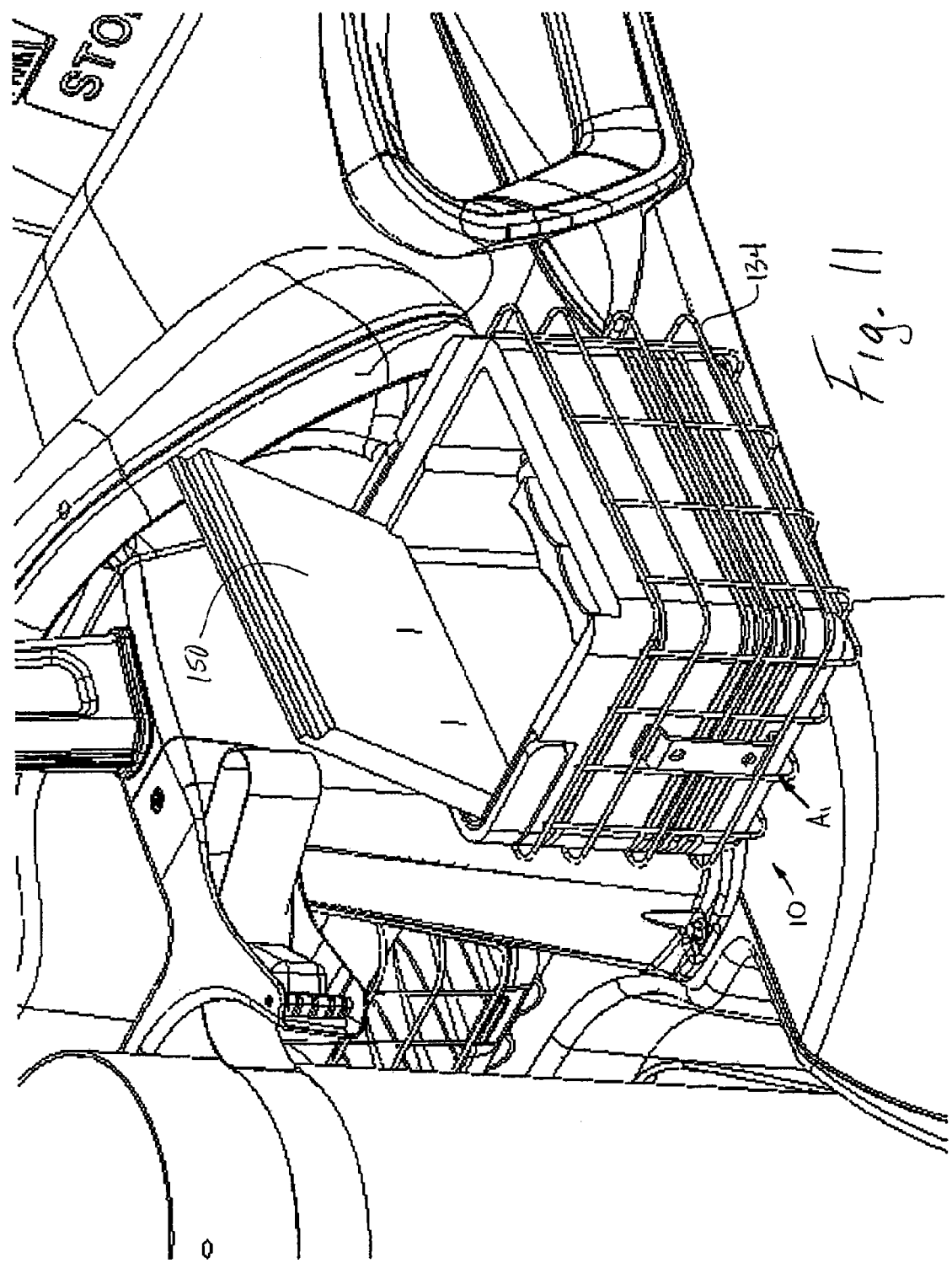

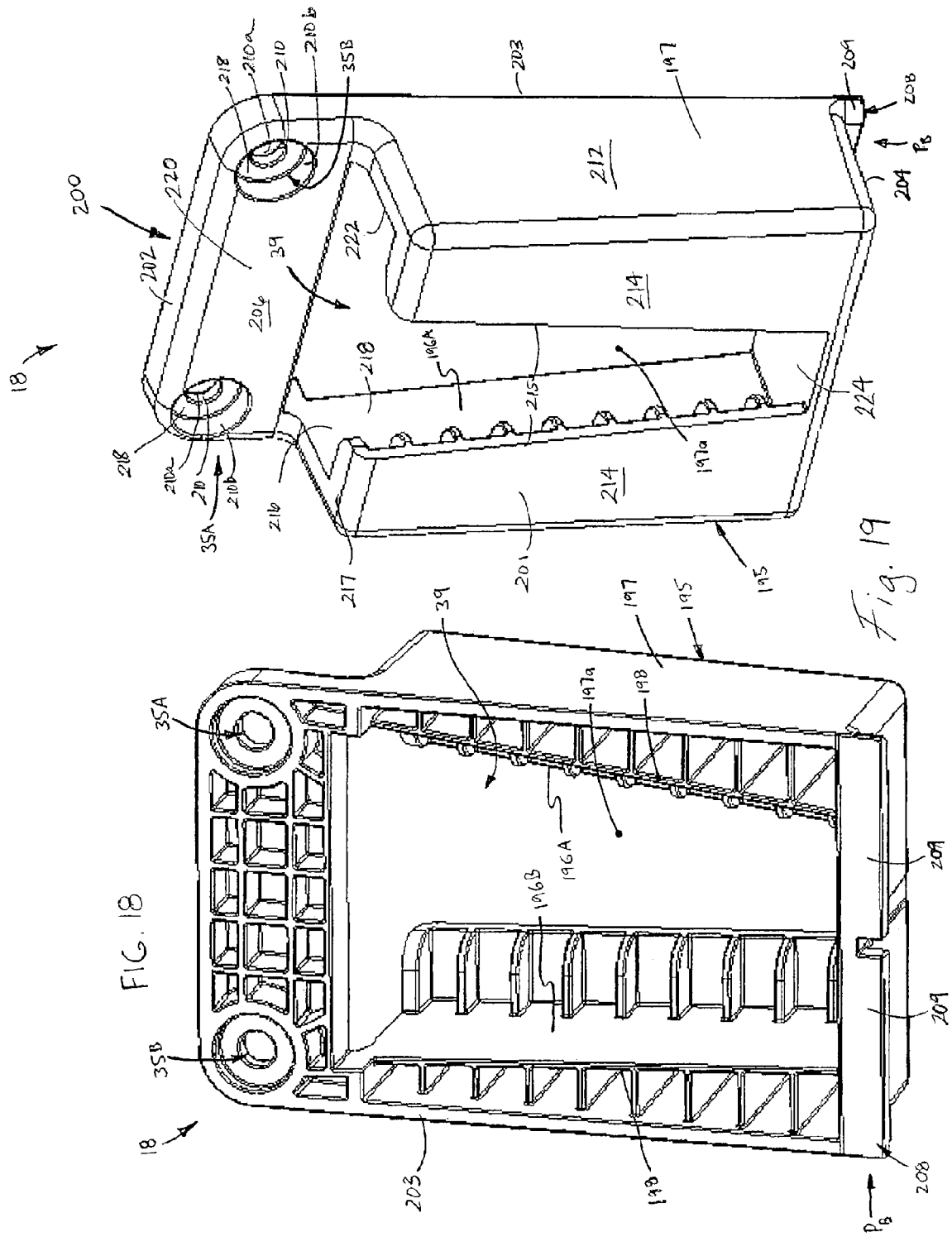

UNIVERSAL ACCESSORY MOUNTING SYSTEM FOR GOLF CARS AND UTILITY VEHICLES

RELATED APPLICATIONS

This patent application is a continuation of U.S. patent application Ser. No. 11/048,471 filed Jan. 31, 2005 which claims priority to U.S. Provisional Application Ser. No. 60/540,181, filed Jan. 29, 2004, the entire contents of both applications are incorporated herein by reference.

BACKGROUND

The invention relates to golf cars and utility vehicles, and more particularly, to devices for mounting accessories to such vehicles.

Vehicles such as golf cars and utility vehicles often include accessories for use in applications that are beneficial to the intended users of the vehicle. For example, golf cars typically include accessories such as beverage coolers, golf ball/club head washers, sand bottles, etc. Generally, each such accessory is mounted at a different, specific location on the vehicle, such as on the body, the seat assembly, canopy struts, etc. Further, each accessory typically requires a specific bracket or other mounting component, which are attachable to the vehicle in a substantially different manner (i.e., different number and/or spacing of bolts, etc.).

SUMMARY

In one embodiment, the invention provides a golf accessory for attaching to an accessory mounting system of a golf car. The accessory mounting system including a bracket that is configured to connectably receive the golf accessory and a mount for attachment to the golf car and configured to connectably receive the bracket. The mount includes a base that has a generally vertical surface, an aperture extending generally horizontally into the base from the vertical surface and configured to receive a portion of a fastener coupled with the bracket, and a slotted opening extending into the base and configured to receive a portion of the bracket. The base includes a generally horizontal surface and the slotted opening extends generally vertically into the base from the horizontal surface. The golf accessory includes a golf-related item, and means for connecting the golf-related item to the bracket.

In another embodiment, the invention provides a golf accessory assembly for use with a golf car that includes a mount. The mount includes a base that has a generally vertical surface, an aperture extending generally horizontally into the base from the vertical surface, and a slotted opening extending into the base. The base includes a generally horizontal surface and the slotted opening extends generally vertically into the base from the horizontal surface. The golf accessory assembly includes a bracket adapted for connection to the mount of the golf car, a container for holding a golf accessory such that at least a portion of the golf accessory is disposed within the container, and means for connecting the container to the bracket.

BRIEF DESCRIPTION OF THE DRAWINGS

The present invention is further described with reference to the accompanying drawings, which show an exemplary embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numeral indicate like parts:

FIG. 5 is a bottom perspective view of the structural accessory mount assembly shown in FIGS. 2 and 3;

FIG. 6 is a partial perspective view of the golf car or utility vehicle shown in FIG. 1 and illustrates a first adapter bracket attached to the universal accessory mount assembly;

FIG. 7 is a front perspective view of the first bracket illustrated in FIG. 6;

FIG. 8 is a rear perspective view of the first bracket illustrated in FIG. 6;

FIG. 9 shows the first bracket as illustrated in FIG. 6 with a container and sand bottle attached to the bracket;

FIG. 10 shows the first bracket as illustrated in FIG. 6 with a basket attached to the first bracket;

FIG. 11 shows the basket as illustrated in FIG. 10 with a cooler positioned within the basket;

FIG. 18 is a front perspective view of the third bracket shown in FIG. 17;

FIG. 19 is a rear perspective view of the third bracket illustrated in FIG. 17;

DETAILED DESCRIPTION

Figure 1:
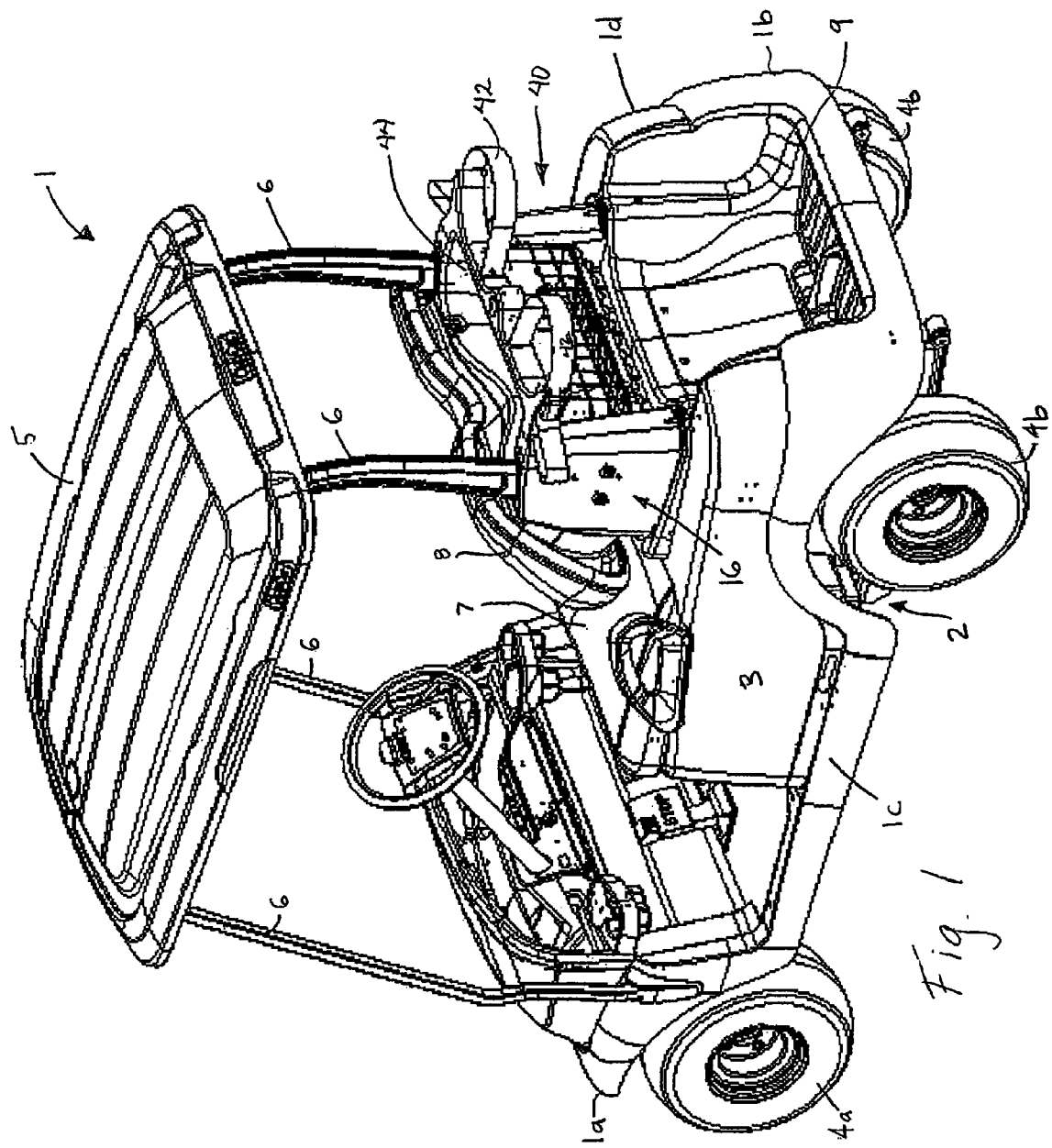
FIG. 1 is a perspective view of a vehicle incorporating a universal accessory mounting system in accordance with the present invention.

Certain terminology is used in the following description for convenience only and is not limiting. The words "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-21 a "universal" accessory mounting system 10 for attaching at least first and second accessories $A_1$, $A_2$ to a vehicle 1. The accessory mounting system 10 basically comprises at least first and second mounting or "adapter" brackets 12, 14, respectively, and a mount 16 configured to connectably receive either bracket 12, 14. The first adapter bracket 12 is configured to connectably receive at least the first accessory $A_1$, and preferably to separately receive each one of a plurality or group of first accessories $A_1$. Specifically, the one or more first accessories $A_1$ are formed or constructed so as to be attachable to (or through) only the first bracket 12, and not the second bracket 14, as described below. The second adapter bracket 14 is configured to connectably receive the second accessory $A_2$, and preferably to separately receive each one of a plurality of second accessories $A_2$ (only one shown), in a manner similar to the structural relationship between the first bracket 12 and the first accessory(ies) $A_1$. Further, the second bracket 14 has a configuration that is substantially different than the configuration of the first bracket 12, as described in detail below, thereby permitting the two brackets 12, 14 to be used with accessories $A_1$, $A_2$ that are substantially different in size, shape, etc. In other words, each bracket 12, 14 has a size, shape, overall structure, or/and structure for engaging with the accessories $A_n$ or the mount 16 (e.g., fastener holes, clamps, fastener posts, etc.) that is different than the other bracket 14, 12, respectively.

Furthermore, the accessory mount 16 is coupled with the vehicle 1 and is configured to connectably receive the first bracket 12 and to alternatively connectably receive the second bracket 14. As such, a first accessory $A_1$ is attached to the vehicle 1 when the first accessory $A_1$ is connected with the first bracket 12 and the first bracket 12 is connected with the mount 16. Alternatively, a second accessory $A_2$ is attached to the vehicle 1 when the second accessory $A_2$ is connected with the second bracket 14 and the second bracket 14 is connected with the mount 16. As described below, the two adapter brackets 12, 14 have common structural features that enable the two brackets 12, 14 to be interchangeably connected with the universal accessory mount 16. Further, one or more accessories $A_n$ may be constructed to be directly connected with the mount 16. That is, the accessory mount 16 is preferably further configured to connectably receive an appropriately formed or constructed accessory $A_n$ without the use of either bracket 12 or 14.

Preferably, the accessory mounting system 10 further comprises a third bracket 18 configured to connectably receive a third accessory $A_3$, and to preferably to separately receive each one of a plurality of third accessories $A_3$ (only one shown). The third bracket 18 has a configuration substantially different than the configuration of either the first or second brackets 12, 14. Additionally, the mount 16 is further configured to connectably receive the third bracket 18, and may be configured to receive any number of other brackets (none shown), as discussed below. Furthermore, the universal accessory mounting system 10 may include any number of additional brackets, e.g., a fourth bracket, a fifth bracket, etc., each adapted to attach one or more different accessories $A_n$ to one common accessory mount 16.

Referring now to FIGS. 1-5, the vehicle 1 preferably includes two accessory mounts 16 each located generally on a separate lateral side 1c, 1d (i.e., driver and passenger sides) of the vehicle 1, as discussed below, but may include any number of mounts 16 as desired (e.g., one, three, etc). However, as each accessory mount 16 is substantially identically formed, the description provided herein focuses on the structure of a single mount 16 for convenience only.

Preferably, the universal accessory mount 16 includes a base 20 coupled with the vehicle 1, and at least one connective aperture 22 and a slotted retainer opening 24 each extending into the base 20. The base 20 preferably includes at least one generally vertical surface 21 and a generally horizontal surface 23, for reasons described below. Preferably, the base 20 is provided by a body 26 coupled with the vehicle 1, and most preferably a generally rectangular block 28 configured to support a seat back 8, as discussed in further detail below. However, the base 20 maybe provided by a body 26 of any appropriate structure, such as a solid block or housing otherwise shaped or configured, or the base 20 may be integrally formed with the vehicle 1. For example, the mount base 20 may be provided by a section of the vehicle body 3 or by another portion or component of the vehicle 1.

Further, the connective aperture 22 is configured to receive a portion of a fastener F coupled with one accessory $A_n$, but may alternatively be configured to receive a fastener F integrally formed with an accessory $A_n$ or even a portion of the accessory An itself. Most preferably, the accessory mount 16 includes two connective apertures 22; specifically, a first aperture 25A and a second aperture 25B spaced from the first aperture 25B, with each aperture 25A, 25B being configured to receive a separate fastener F or an accessory portion $P_A$. Further, each aperture 22 preferably extends generally horizontally into the base 20 from the vertical surface 21 and are substantially horizontally spaced apart, as depicted in the drawings (see, e.g., FIGS. 2 and 3). However, the connective apertures 22 but may extend vertically from a horizontal surface (not shown) or be otherwise disposed in the base 20, depending on the base structure.

Figure 4:
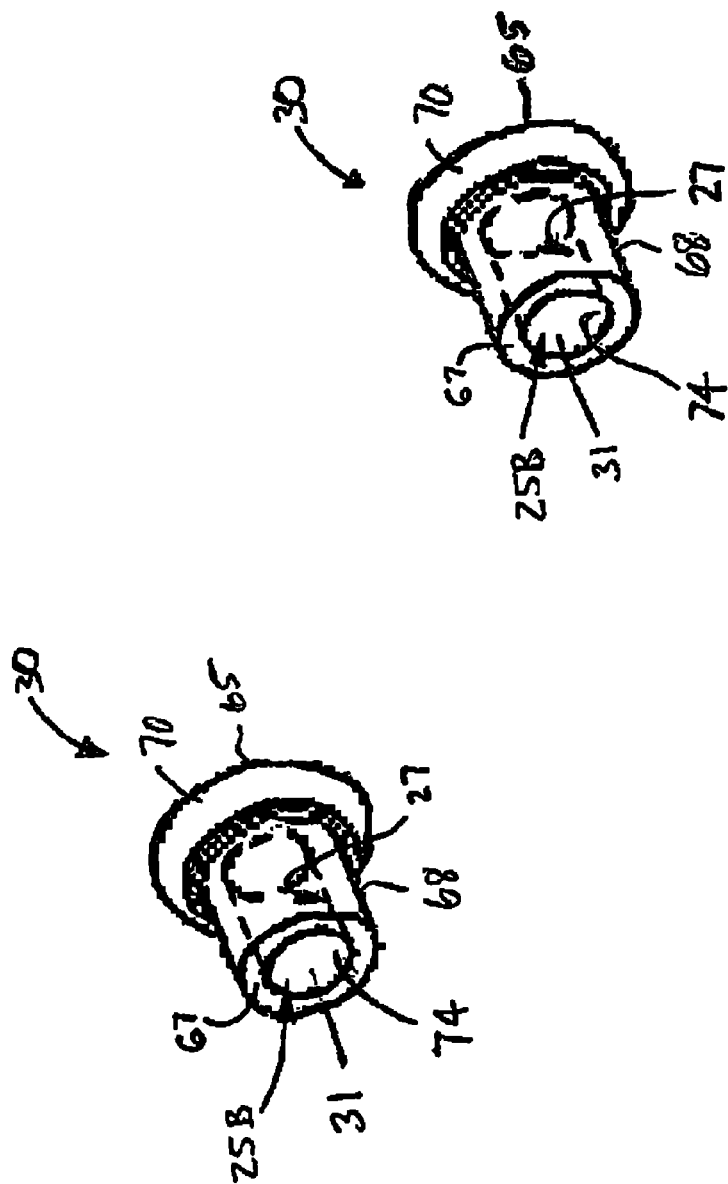
FIG. 4 is a perspective view of preferred threaded inserts providing apertures of the accessory mount.

Preferably, the mount base 20 includes at least one and preferably two circumferential interior surfaces 27 each defining a separate one of the two preferred apertures 25A, 25B, as indicated in FIG. 4. Further, an interior thread(s) (not shown) is preferably formed on each interior surface 27, and the fastener(s) F each include a threaded section threadably engageable with the aperture thread(s) to thereby attach the associated bracket 14, and/or accessory A by a "bolted" connection. However, the apertures 22 may alternatively be formed with one or more projections (none shown) extending generally radially inwardly from the interior surface 27, or with one or more openings (none shown) extending generally radially outwardly from the interior surface 25 into the base 20. With such alternative fastening means, each projection or opening is engageable with or by a corresponding opening/projection on a fastener F, as discussed below.

Furthermore, the accessory mount 16 most preferably includes at least one and preferably two generally cylindrical inserts 30 disposed within the base 20 and having a hole 31 providing one aperture 22. In other words, the hole 31 of each cylindrical insert 30 is defined by one circumferential surface 27 and includes the preferred interior threads, and preferably extends completely through the insert 30. Alternatively, the connective aperture(s) 22 may be formed directly in the base 20 and may extend partially or completely through a wall portion thereof (i.e., may be blind hole or through hole).

Still referring to FIGS. 1-5, the slotted retainer opening 24 is spaced vertically below the one or more apertures 22 and is configured to receive a portion $P_B$ of one bracket 12 or 18, as described below. Specifically, the slotted opening 24 is configured to receive a portion of the first bracket 16 or to alternatively receive a portion of the second bracket 18 (or third bracket 18), depending on which bracket 12, 14, or 18 is to be connected with the mount 16. Additionally or alternatively, the slotted opening 24 may be configured to receive one or more portions $P_A$ of an accessory $A_n$, as is also discussed below. Further, the slotted opening 24 preferably extends generally vertically into the base 20 from the base horizontal surface 23 and is formed as an elongated recess or groove extending generally horizontally along the intersection of the two base surfaces 21, 23, as discussed in further detail below. Alternatively, the slotted opening 24 may extend generally horizontally into the base 20 from the vertical surface 21 or/and may extend completely through a portion of the base 20, so as to be a "through hole" as opposed to a recess or groove, as depicted in the drawing figures.

Referring generally to FIGS. 6-21, each adapter bracket 12, 14, 18 preferably includes at least one and preferably two bracket mounting or "bracket" apertures 35A, 35B each alignable with a separate one of the two preferred apertures 25A, 25B of the accessory mount 16. As such, a fastener F is disposeable within, or extendable through, each bracket aperture 35A, 35B and the mount aperture 25A, 25B aligned with the particular bracket aperture 35A, 35B. Thus, the adapter brackets 12, 14, 18 are each separately secured to the accessory mount 16 by two fasteners F, but may alternatively be connected with the mount by any other appropriate means, such as a single fastener, three or more fasteners, one or more posts extending from the mount 16, etc. Additionally, the first and third brackets 12, 18, respectively, each preferably have an engagement portion $P_A$ disposeable within the mount slotted opening 24 to provide an additional means for securing the bracket 12, 18 to the accessory mount 16. However, the second adapter bracket 14 is preferably formed without such an engagement portion, but rather has a generally horizontal portion 176 that rests upon an adjacent body surface 160 of the vehicle 1, as described below.

Further, the first adapter bracket 12 is preferably configured to receive a portion of at least one fastener F coupled with the first accessory $A_1$ so as to connect the first accessory $A_1$ with the bracket 12. Preferably, the first bracket 12 has at least one accessory mounting aperture 37 for receiving the fastener F, as described below. Preferably, the second and third brackets 14, 18 are each configured to frictionally engage with at least a portion $P_A$ of the respective second and third accessories $A_2, A_3$ so as to connect the particular accessory $A_2$ or $A_3$ with the associated bracket 14, 18. However, the second bracket 14 preferably engages with the second accessory(ies) $A_2$ by the interaction of two "latch" tabs 170 on the second accessory $A_2$ with two opposing engagement or "latching" surfaces 38 on the bracket 14 (see FIGS. 14-16), whereas the third bracket 18 has an aperture 39 (see FIGS. 17-19) configured to receive a single "bayonet" projection 252 of the third accessory $A_3$, as described in detail below. Furthermore, each of the mounting brackets 12, 14, 18 may be configured to connectably receive or engage with a particular accessory $A_1$, $A_2$, $A_3$, etc., in any alternative, appropriate manner.

Figure 14:
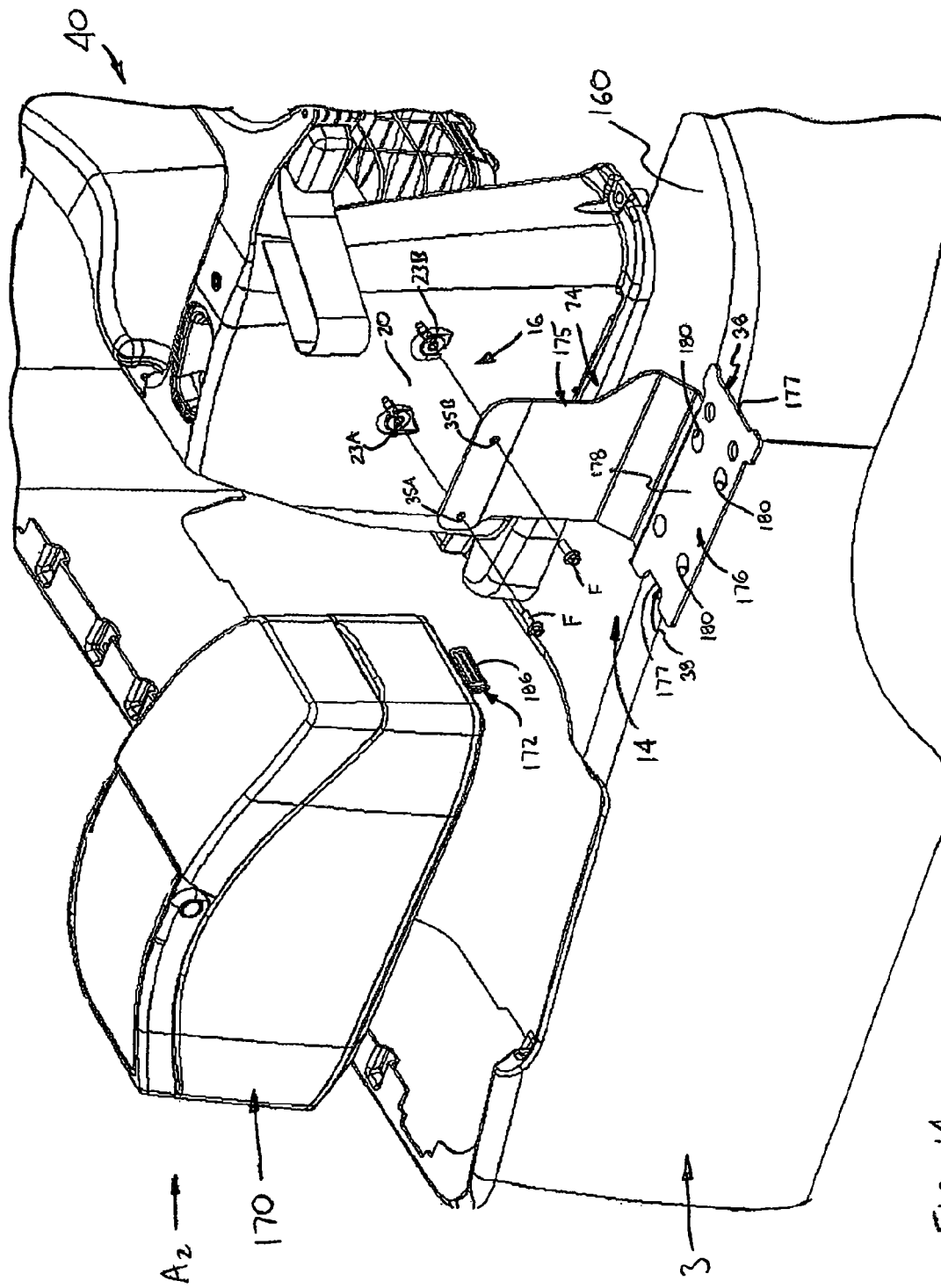
FIG. 14 is a partially broken-away, perspective view of a second bracket and the accessory mount, shown with the bracket spaced from the mount and with a cooler accessory.
Figure 15:
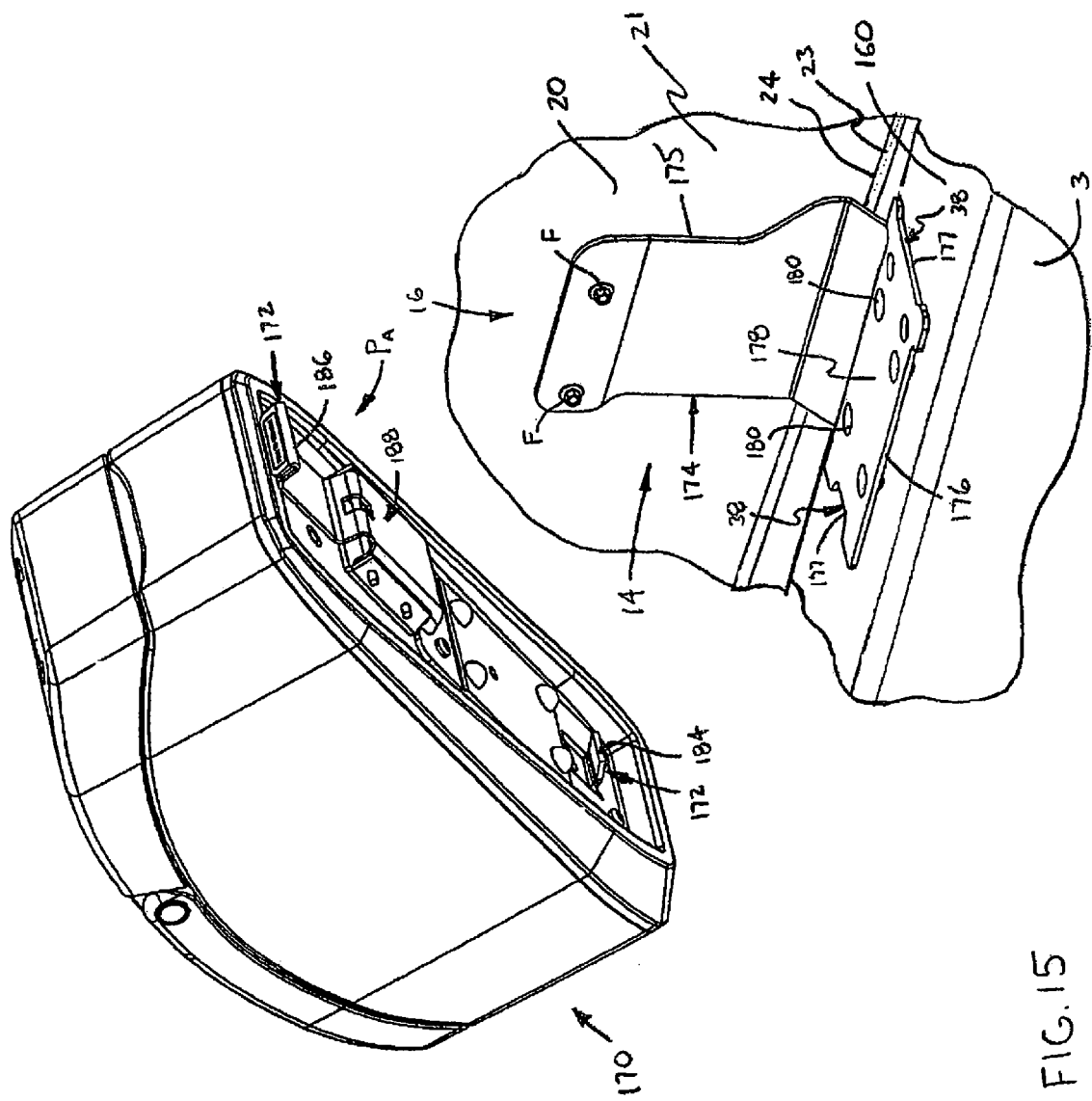
FIG. 15 is a broken away view of the second adapter bracket connected with the accessory mount and shown with the cooler.
Figure 20:
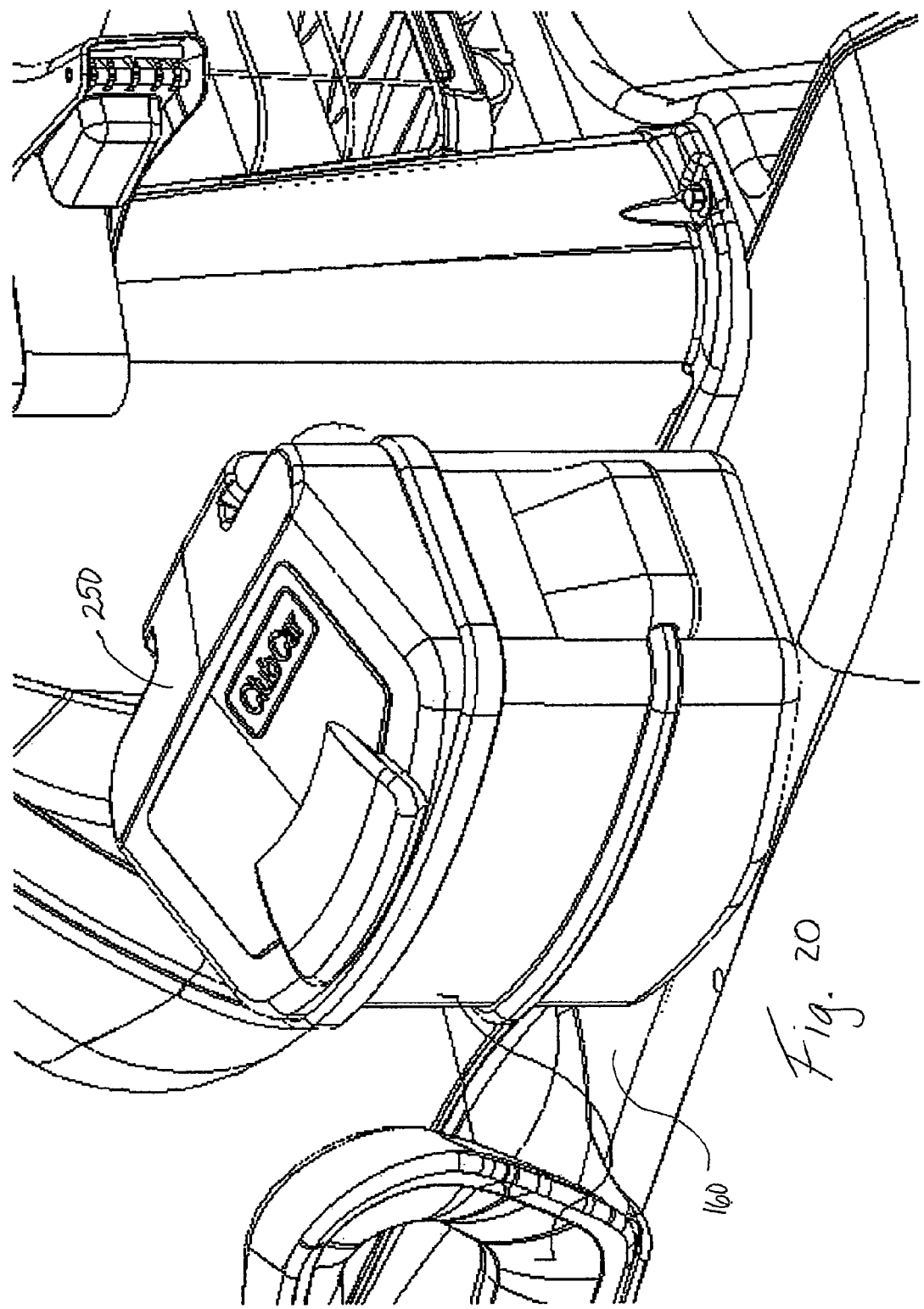
FIG. 20 shows a sand bucket accessory connected with the third bracket illustrated in FIG. 17.
Figure 21:
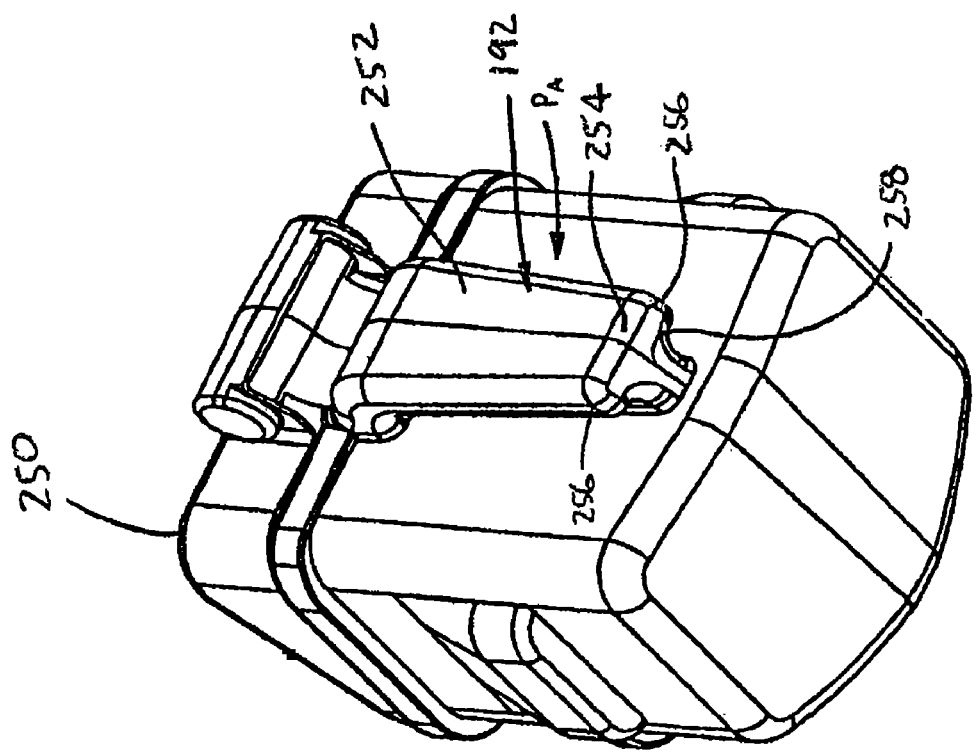
FIG. 21 is a rear perspective view of the sand bucket accessory shown in FIG. 20.

With the accessory mounting system 10 as described above, a plurality of various different accessories $A_n$ may be mounted to the vehicle 1 using a single accessory mount 16, each accessory $A_1$, $A_2$, $A_3$ being of a different type than the other accessories $A_1$, $A_2$, $A_3$. In other words, the various accessories $A_n$ each have a different configuration (shape, size, etc.), or/and provide a different use or function (beverage cooling, divot repair, item storage, etc.), than the other accessories $A_n$. Preferably, the first adapter bracket $A_1$ is configured to mount first accessories $A_1$ that include container 130 for holding a sand bottle 132 and a basket 134 for holding a cooler 150, a golf equipment washer 152, or various other miscellaneous items. The second bracket 14 is $A_1$ is preferably configured to mount at least one second accessory $A_1$ that includes a cooler 170 and sandbucket (not shown), as shown in FIGS. 14 and 15. Furthermore, the third bracket 18 is preferably configured to at least connect another type of sand bucket 250 with the vehicle 1, as depicted in FIGS. 20 and 21. However, each bracket 12, 16 or 18 may be used with any appropriate type of accessory $A_n$, as desired.

Thus, each adapter bracket 12, 14, 18 basically functions to provide a different means (e.g., threaded fasteners, latching tabs, and a "bayonet" connection) for connecting particular accessories $A_n$ to the brackets 12, 14, 18, or/and substantially different sized or shaped brackets 12, 14, 18 to accommodate different accessories $A_n$, but which are all connectable or attachable to a single accessory mount 16 on the vehicle 1. Having described the basic elements of the present invention above, these and other components and details of the accessory mounting system 10 are described in further detail below.

Referring to FIG. 1, the universal accessory mounting system 10 of the present invention is preferably used with a vehicle 1 constructed as a golf car, utility vehicle, neighborhood vehicle, etc. The vehicle 1 has a front end $1a$, a rear end $1b$, and two lateral sides $1c$, $1d$ extending between the ends $1a$, $1b$. Preferably the vehicle 1 includes a frame 2, a body 3 disposed on the frame 2, and two front wheels $4a$ and two rear wheels $4b$ rotatably connected with the frame 2. Preferably, the vehicle 1 also includes a canopy 5, canopy supports 6, a seat 7, a seatback 8, and a golf bag support or well 9. Most preferably, the vehicle 1 also includes a structural accessory mount or "SAM" assembly 40 used to support or connect the canopy 5, canopy supports 6, and the seat back 8 to the vehicle 1. The SAM assembly 40 also preferably includes golf bag support ties 42, a storage compartment 44 and at least one and preferably two universal accessory mounts 16, as described above and in further detail below.

Figure 2:
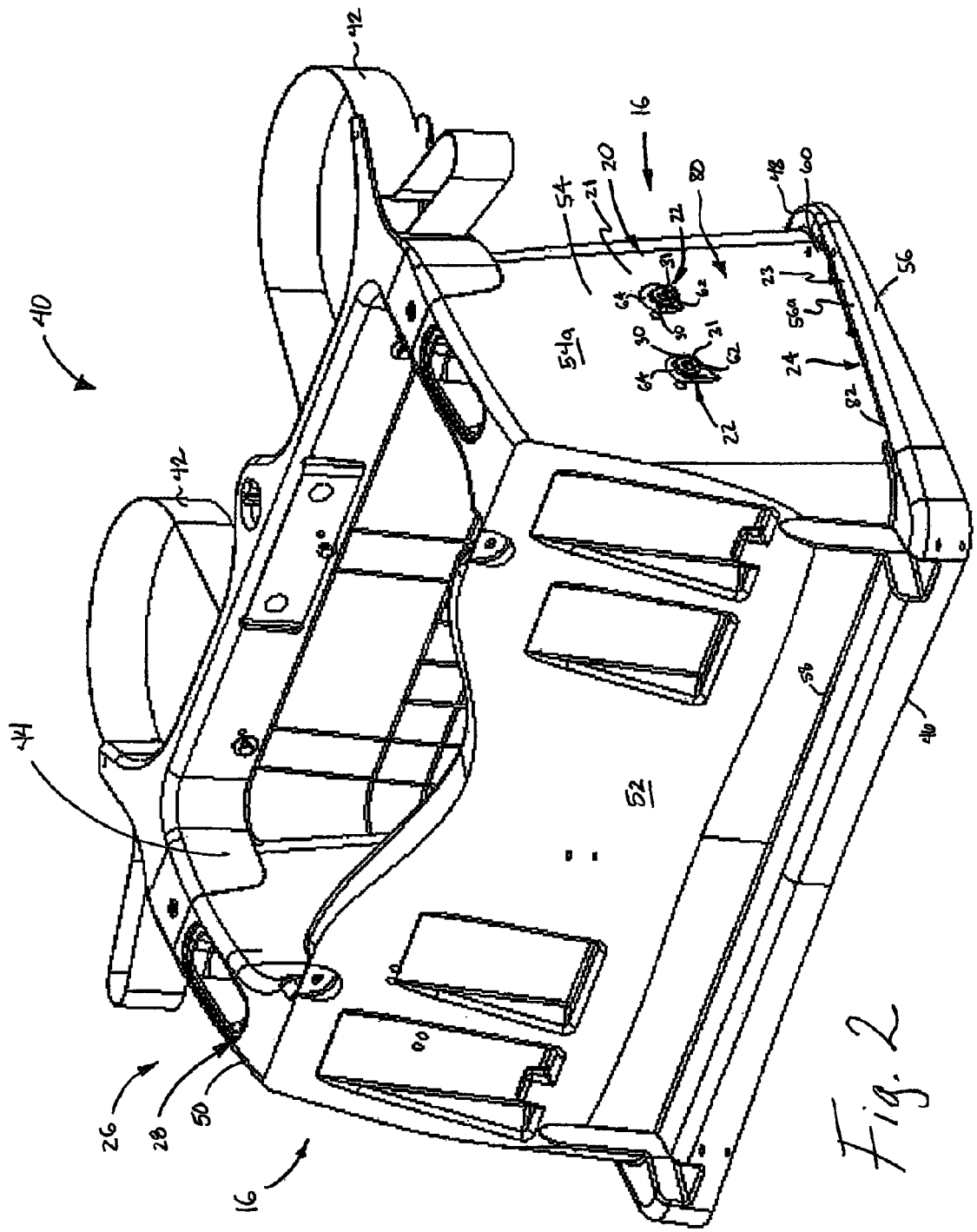
FIG. 2 is a perspective view of an accessory mount of the accessory mounting system, shown provided by a support member connectable with a body of the vehicle of FIG. 1.
Figure 3:
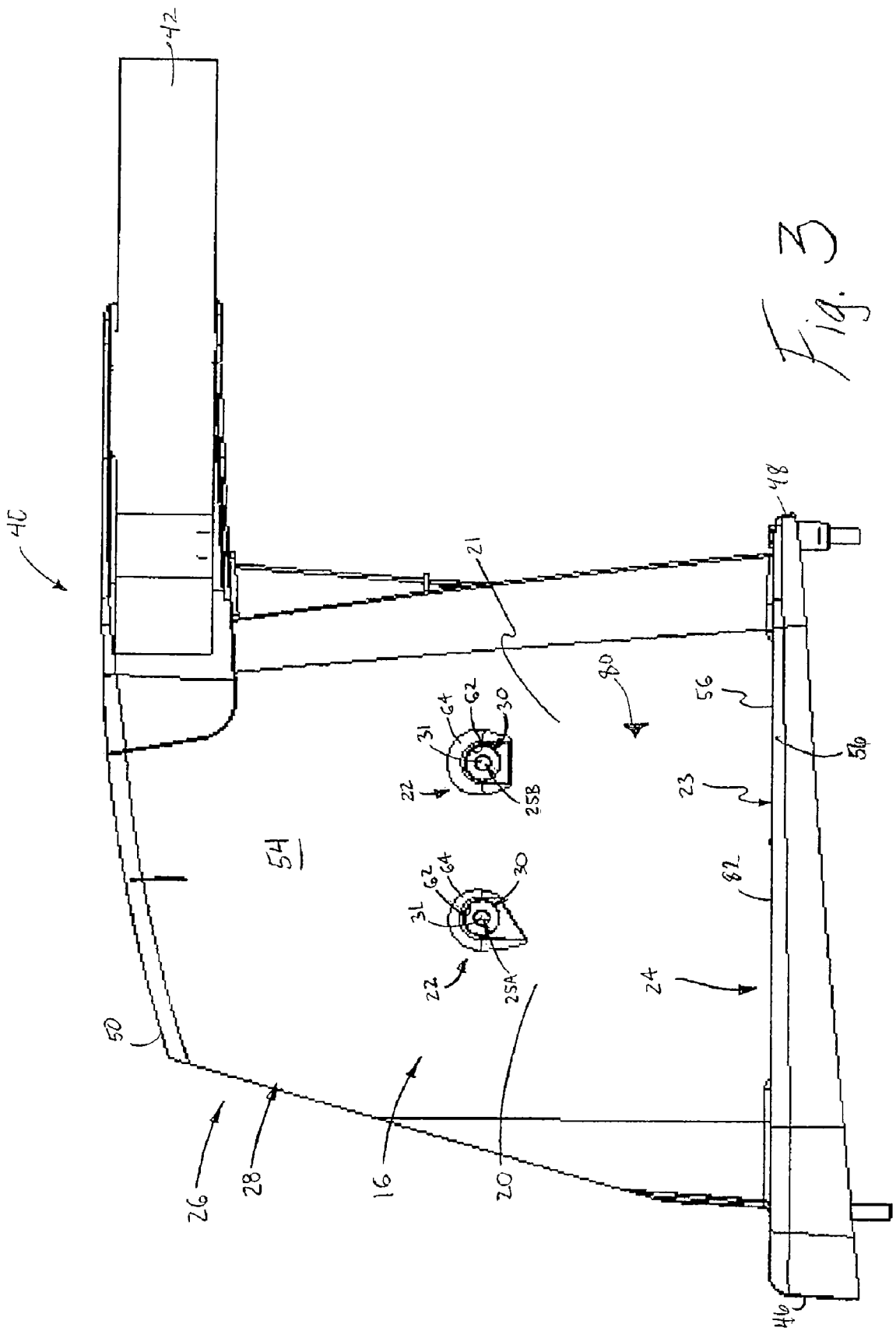
FIG. 3 is a side elevational view of the accessory mount shown in FIG. 2.

FIGS. 2 and 3 shows more detailed views of the SAM assembly 40 and the preferred structure of the universal accessory mount 16. The SAM assembly 40 extends longitudinally with respect to the vehicle 1 from a front edge 46 adjacent the seatback 21 to a rear edge 48 adjacent the golf bag support or well 28, as best shown in FIG. 1. The SAM assembly 40 has a transverse width with respect to the vehicle 1 approximately equal to that of the golf bag support or well 28. The SAM assembly 40 includes a body 50, preferably formed as a solid unitary structure (i.e., one-piece construction) of molded polymer, having a generally vertical, forward-facing wall 52, two generally vertical side walls 54, and a ledge 56 extending along and adjacent bottom edges 58 and 60 of the walls 52 and 54, respectively. In some embodiments, as illustrated in FIG. 5, the molded polymer body 50 is hollow with an open bottom and closed top. The molded polymer body 50 is preferably injection-molded of a fiber-reinforced polymer, and more particularly, is preferably formed of an injection-molded 20% glass-filled polypropylene copolymer, such as POLYFORT® FPP 1220 (available from A. Schulmann, Inc.).

As best shown in FIGS. 2 and 3, each accessory mount 16 is preferably formed in or provided by one of the side walls 54 of the SAM assembly 40. Each side wall 54 preferably has a generally vertical exterior surface 54a providing the accessory mount vertical surface 21, and a portion of the ledge 56 proximal to the side wall 54 has a generally horizontal surface 56a providing the mount horizontal surface 23. Two horizontally spaced apart through holes 62 extend through the side wall 54 and are both located generally centrally thereon. The side wall 54 further includes integrally-formed support surfaces 64 adjacent the through holes 62. The preferred cylindrical inserts 30 providing the accessory mount connective apertures 22, as described above, are each preferably disposed within a separate one of the two through holes 62 so as to mount the inserts 30 to the SAM assembly 40. Preferably, the connective apertures 22 (i.e., the insert through holes 31) are generally concentric with the side wall through holes 62, as shown in the illustrated embodiment.

Referring to FIGS. 4 and 5, the preferred inserts 30 of the accessory mount 16 each preferably have a generally circular cylindrical shape, but may have any other appropriate desired shape or structure (e.g., tubular, generally hexagonal, generally square, etc.). When disposed in the mount base 20, each insert 30 extends from an outer end 65 located generally at the side wall outer surface 54a to an inner end 67 spaced from the side wall inner surface 54b and disposed generally within the molded polymer body 50 (see FIG. 5). Each insert 30 preferably includes a circular cylindrical body 68, an end cap 70 formed with the body 68, and a circumferential interior surface 74. The interior surface 74 extends through the body 68 and cap 70 and defines the insert through hole 31, as best shown in FIG. 4. Preferably, as discussed above, the interior surface 74 is threaded (not depicted) to engage with threaded fasteners F for mounting the brackets 12, 14, 18, or accessories $A_n$, to the vehicle 1. However, as mentioned above, the interior surface 74 of each insert 30 may instead include a raised edge or groove to engage in a snap-fit or tongue-and-groove relationship with a fastener F. The insert main body 68 may have a circular shape, as shown in the illustrated embodiment, may be textured or smooth, and is sized or dimensioned to be inserted into apertures 22.

Further, each insert cap 70 is generally disc-shaped and has an outer diameter that is relatively larger than the main body 68, such that the cap 70 is positioned adjacent the support surfaces 64 on the exterior of the side wall 54 while the main body 68 extends inwardly from the cap 70 so as to be disposed within the molded polymer body 50 of the SAM assembly 40. As best shown in FIG. 4, the through holes 31 each preferably extend from the insert outer end 65 to the insert inner end 67, and thus having two open ends. However, the connective apertures 22 need not extend entirely through each insert 30, but may rather extend from the outer end 65 may end prior to the inner end 67, thereby having only one open end (i.e., formed as a "blind" hole). Furthermore, the accessory mount inserts 30 may be fabricated, molded and/or cast of a number of different materials, including without limitation steel, aluminum, polypropylene, ultra-high molecular weight polyethylene, and the like. In a preferred form of the invention, the inserts 30 are formed of steel.

As best shown in FIG. 2, the slotted retainer opening 24 of each accessory mount 16 is preferably formed as an elongated recess 82 extending horizontally longitudinally with respect to the vehicle 1 and vertically downwardly into the ledge 56 of the SAM body 50. The recess 82 is generally located at the intersection between the side surface bottom edge 60 and the ledge 56. Further, the recess 82 is spaced a vertical distance from the apertures 22 and enables the adapter brackets 12, 18 or accessories $A_n$ to be further secured to the vehicle 1 by inserting at least a portion thereof into the recess 82, as described in further detail below. The recess 82 is preferably one continuous, upwardly-opening channel that extends longitudinally with respect to the vehicle 1, but may instead include a plurality of shorter recesses or indentations located to interact with a portion, edge or protrusion of a bracket 12, 18 or an accessory $A_n$. Further, the slotted retainer opening 26 may alternatively extend into the side wall 54 or/and may extend completely through the ledge 56 or side wall 54, as opposed to having only an upper open end as depicted.

As mentioned above, the universal accessory mount 16 may potentially be attached to or formed with the vehicle 1 without incorporating a surface or golf car body portion. That is, the aperture(s) 22 and recess 24, forming an accessory mount 16 as described above, may be formed in a variety of structures, including without limitation structures suspended (rigidly or loosely) from a portion of the vehicle 1, for example, from a top area of the molded polymer body 50, and/or structures supported by a portion of the vehicle 1, for example, by a portion of the body 3 of the vehicle 1 positioned adjacent the molded polymer body 50.

Referring to FIGS. 6-13, the first adapter bracket 12 preferably includes at least one and preferably two first or "bracket" apertures 35A, 35B (described above) and at least one and preferably two second or "accessory" apertures 37. Each first bracket aperture 35A, 35B is alignable with a separate one of the mount connective apertures 25A, 25B, such that a fastener F is extendable through the two aligned apertures 25A/35A and 25B/35B to releasably connect the first adapter bracket 12 with the mount 16. Further, each accessory aperture 37 is spaced from the one or more bracket apertures 35 and is configured to receive a fastener F coupled with one first accessory $A_1$ so as to connect the accessory $A_1$ with the first bracket 12.

As best shown in FIGS. 7 and 8, the first adapter bracket 12 preferably includes a generally T-shaped body and is thus formed as a "T bracket" 100. The T bracket 100 preferably has a first, substantially horizontal upper portion 102 and a second, substantially vertical elongated portion 104. The T bracket 100 has a front end 101 that faces outwardly from the vehicle 1 and a rear end 103 that is positioned adjacent the side wall 54 when mounted to the vehicle 1. The T bracket 100 has a height as measured from a top end 108 of the T bracket 100 to a bottom end 110 that at least approximately corresponds to the vertical distance between the apertures 22 and the slotted retainer opening 24 of the universal accessory mount 16. Further, the T bracket 100 preferably further has at least one downwardly extending projection 106 extending from the bottom end 110. The one or more projections 106 are preferably formed as a plurality of tabs or protrusions dimensioned to be received in the elongated recess 82, and thus provide the bracket engagement portion $P_B$, as discussed above. When the projections 106 are located within the recess 82, a front portion of the bottom edge 110 rests upon the ledge 56 of the molded polymer body 50, as best shown in FIG. 6.

The upper portion 102 of the T bracket 100 includes the two bracket apertures 35A, 35B, described above, which are preferably formed as counterbore through holes 112 spaced a horizontal distance apart corresponding to the spacing distance between the centers of mount connective apertures 25A, 25B, i.e., between the two insert through holes 31. In the illustrated embodiment of the T bracket 100, the holes 112 are located proximal to opposite horizontal ends 114 of the upper portion 102, but may be located at any positions on the bracket upper portion 102. Further, the bracket upper portion 102 may be formed with any appropriate shape as long as the holes 112 in the T bracket 100 are positioned to correspond with the mount connective apertures 22. As best shown in FIG. 7, the preferred counterbore holes 112 each have a larger-diameter hole section 112*b* adjacent to and concentric with a smaller-diameter hole section 112*a*, the hole sections 112*a* and 112*b* being separated by a generally radial washer-type element 118. That way, for example, a fastener F having a head portion and an elongated portion (e.g., a bolt) may be used to connect the bracket 12 to the mount 16, the elongated portion fitting within the hole section 112*a* and the head portion of that fastener fitting within the hole section 112*b* and adjacent the washer-type element 118. Alternatively, the bracket holes 112 may extend with a generally constant diameter between the bracket front and rear ends 101, 103, respectively or may be formed in any other appropriate manner.

As shown in FIGS. 7 and 8, the upper horizontal portion 102 of the preferred T bracket 100 may be rounded at the opposing ends 114 to follow the shape of the round holes 112. Preferably, the bracket upper portion 102 further includes a substantially straight central portion 120 extending between the ends 114. The central portion 120 serves to provide a connection between the holes 112 and may have any appropriate shape (e.g., circular, ovular, etc.). As best shown in FIGS. 6-8, the elongated vertical portion 104 of the T bracket 100 extends substantially perpendicularly or orthogonally with respect to the upper portion 102 to the bottom end 110. The two accessory mounting apertures 37 (described above) are preferably disposed within the bracket elongated portion 104, and are preferably provided by two through holes 122. The two holes 122 are spaced a vertical distance apart along the elongated portion 104, but may be horizontally spaced. Further, the accessory apertures 37 are dimensioned to correspond to apertures or fastening devices on the one or more first accessories $A_1$ to be mounted to the vehicle 1 by means of the first bracket 12. Preferably, the bracket vertical portion 104 has a pair of cavities 125 (FIG. 8) extending horizontally into the portion 104 proximal to each through hole 122 so as to form a relatively thin region 126 generally flush with the front 101 and surrounding the holes 122. Preferably, a "captured" nut (none shown) is disposed within each cavity 125 so as to be aligned with the proximal through hole 122 and is engageable by a fastener F extending through the associated hole 122 to connect an accessory $A_n$ with the T bracket 100. Alternatively, each bracket thin region 126 may be engageable with a clip or clamp or a similar structure attached to or integrally formed with the accessory $A_n$. Furthermore, the T bracket 100 may be molded of a polymer, or fabricated, cast or stamped from a metal, and is preferably injection molded of a 20% glass filled polypropylene copolymer, such as POLYFORT® FPP 1220 (available from A. Schulman, Inc.).

Preferably, as discussed above, a variety of different accessories $A_1$ are connectable with the T bracket 100, so as to be mounted to the vehicle 1 through the first adapter bracket 12. Each accessory $A_1$ may include apertures that correspond to holes the 112 or 122 such that a fastener F is inserted into both sets of apertures in order to attach the accessory $A_1$ to the T bracket 100. However, the accessory $A_1$ may instead include an integral fastener, such as a clip, a clamp, a threaded fastener insertable into the apertures 122 or otherwise engageable with the T bracket 100. Further, the first accessory(ies) $A_1$ may be mounted directly to the T bracket 100, or a container for holding at least one additional accessory may be mounted to the T bracket 100. FIG. 9 shows a container 130 mounted to the T bracket 100 by fasteners insertable through apertures (not shown) in the container 130 and into the holes 122 of the T bracket 100. The container 130 is one example of a shape of container that may be mounted to the T bracket 100. A variety of container shapes and dimensions may be mounted to the T bracket 100 depending on the accessory to be held by that container. As shown in FIG. 9, the container 130 houses a sand bottle 132, but may alternatively be used to hold a variety of other accessories, including without limitation a water bottle, a jug, or any other accessory dimensioned to be received within the container 130.

Figure 12:
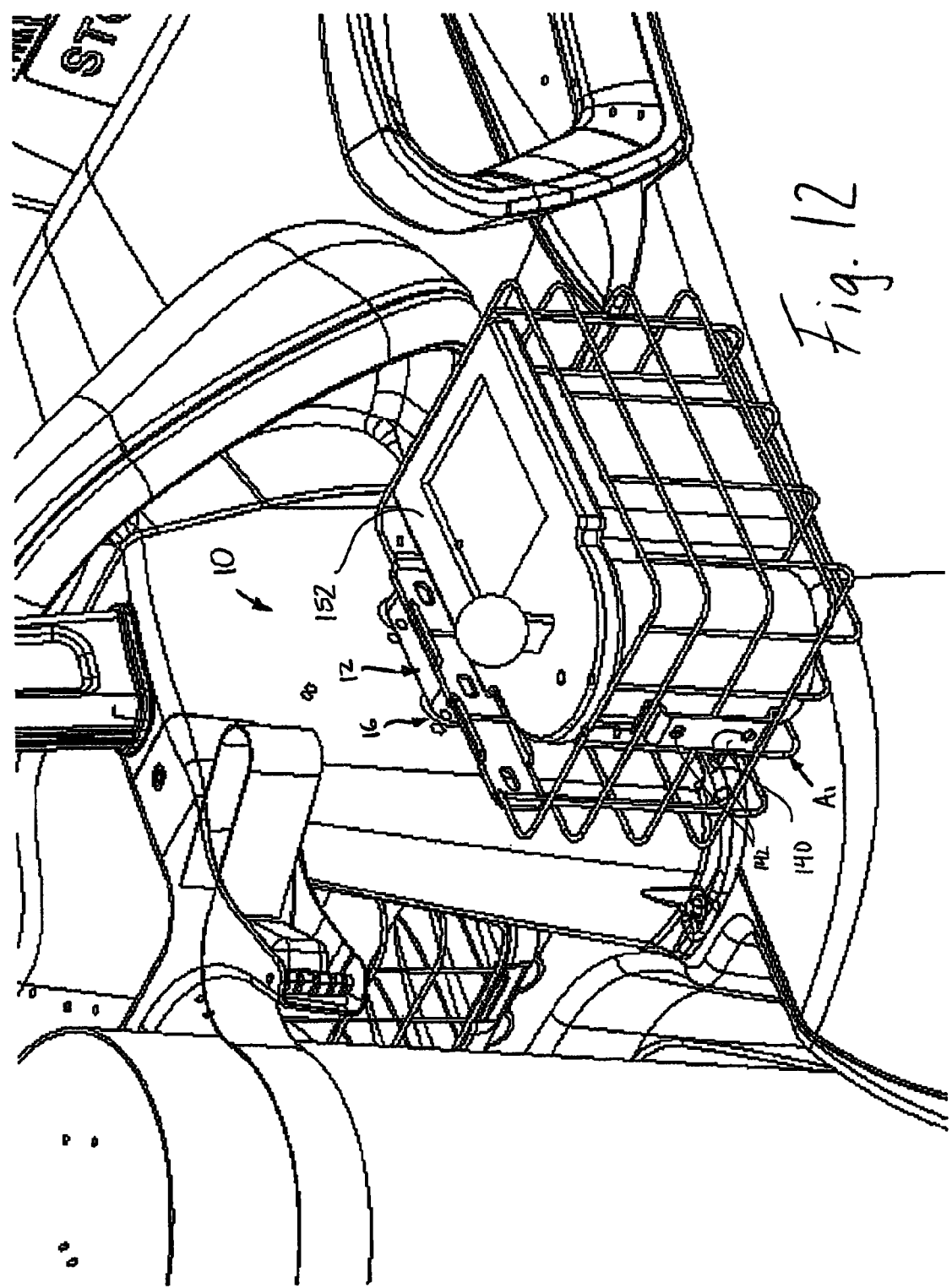
FIG. 12 shows the basket as illustrated in FIG. 10 with a golf ball and golf club head washer positioned within the basket.
Figure 13:
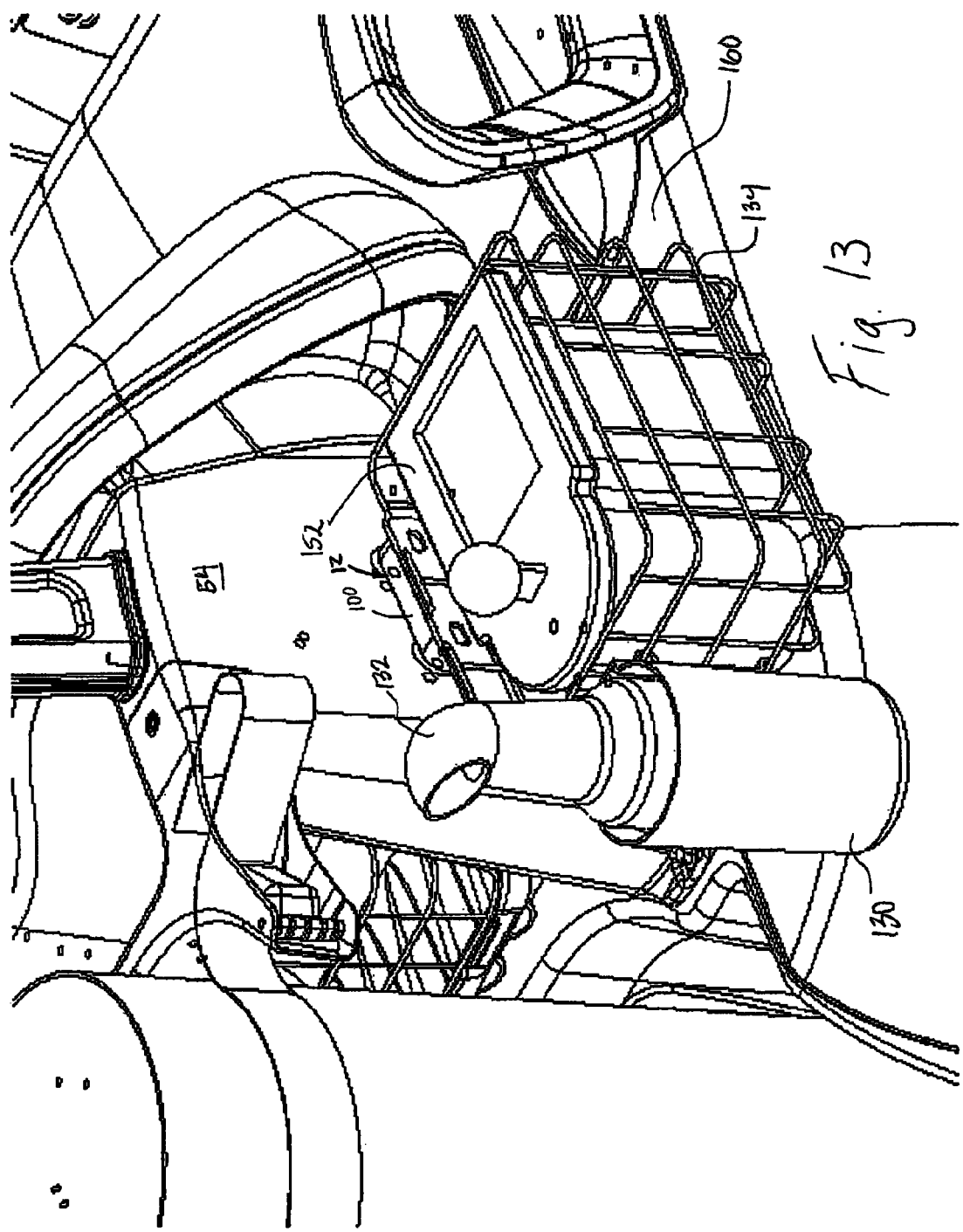
FIG. 13 shows the basket and golf ball and golf club head washer as illustrated in FIG. 12 with a container and sand bottle attached to the basket.

FIG. 10 shows another example of an accessory mountable to the T bracket 100, namely a basket 134 with an open upper end and a generally rectangular box shape. Preferably, the basket 134 has a plurality of apertures 136 along at least one upper edge of the basket 134. The apertures 136 are configured to correspond with holes 112 of the T bracket 100. As shown in FIG. 10, the basket 134 includes three such apertures 136 such that the same basket 134 is mountable to either side 1*c*, 1*d* of the vehicle 1. However, the basket 134 may instead include fasteners, integral or otherwise, that are insertable into the holes 112 or 122 of the T bracket 100. Further, the basket 134 may include additional mounting brackets 140, as shown in FIG. 10, configured to allow additional accessories or additional containers to be mounted to the basket 134. As shown in FIG. 10, mounting brackets 140 include apertures 142 that mimic the arrangement of apertures 122 on the T bracket 100. Therefore, a container 130 such as that shown in FIG. 9 may be mounted to the mounting bracket 140 in a similar manner as the container 130 would be mounted to the T bracket 100. Additionally, a sand bottle 132, such as that shown in FIG. 8 may also be housed in the container 130 mounted to the basket 134 (FIG. 13). Alternatively, the mounting bracket 140 may itself include fasteners or apertures that allow an accessory to be attached to the mounting bracket 140. Further, the basket 134 may be used as an empty storage basket to hold various passenger accessories or to house additional accessories, such as a cooler 150 as shown in FIG. 12. The cooler 150 has a generally rectangular box shape similar to the shape of the basket 134 and is dimensioned to be received within the basket 134. Furthermore, the basket 134 may be used to house a golf ball and/or club head washer, such as the golf ball and club head washer 152 shown in FIG. 12. The golf ball and club head washer 152 is typical of that known in the art and is not described further herein.

An exemplary accessory assembly attached to the T bracket 100 is shown in FIG. 13. The basket 134 is mounted to the T bracket 100, a golf ball and club head washer 152 is positioned in the basket 134, and a container 130 including a sand bottle 132 is mounted to the mounting bracket 140 of the basket 134. Such a modular assembly allows a wide variety of accessories or combinations of accessories to be attached to either side of the vehicle 1. As shown in FIG. 13, the vehicle 1 may have a platform surface 160 that provides additional support to the accessory or combination of accessories. Such a platform 160 is generally not required when using the first adapter bracket 12, but may be advantageous when a large number of accessories $A_1$ are mounted together on one side of the vehicle 1.

Figure 16:
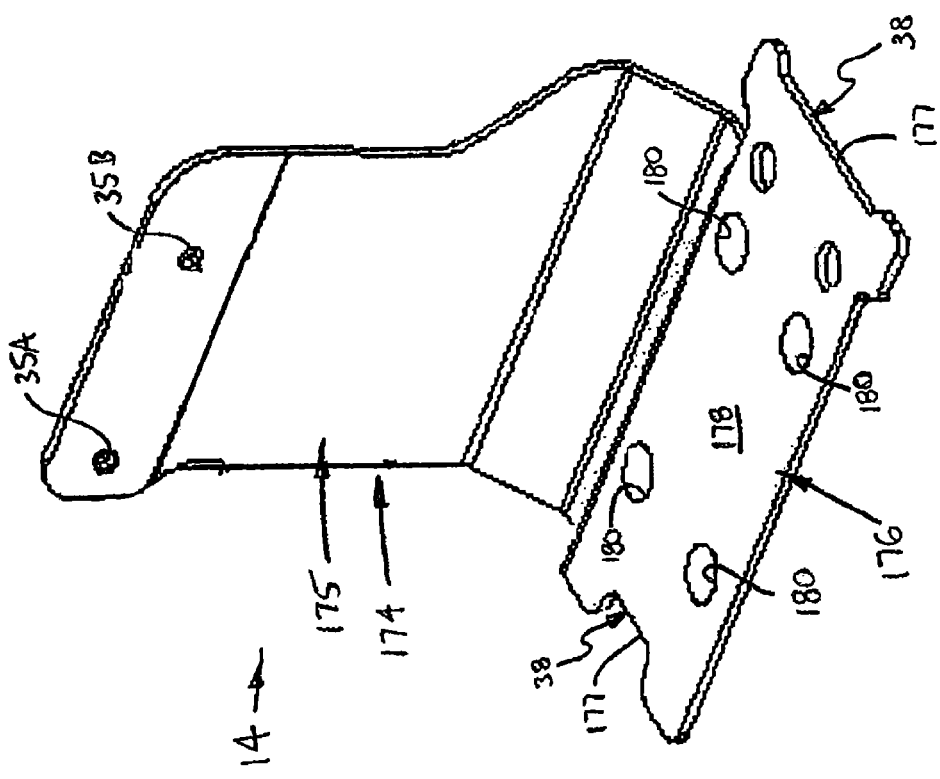
FIG. 16 is an enlarged perspective view of the second bracket.
Figure 17:
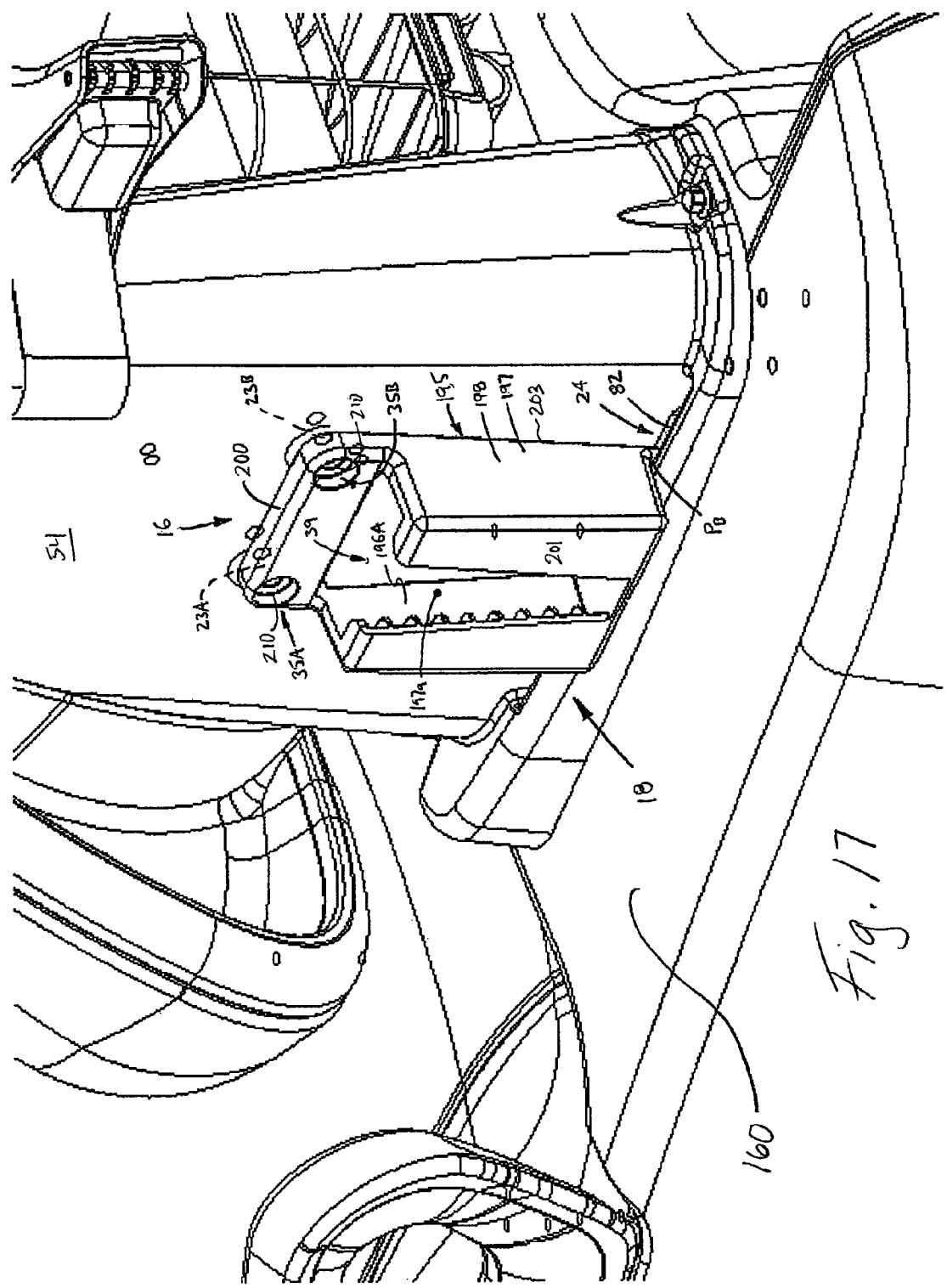
FIG. 17 is a partially broken-away, perspective view of a third bracket of the accessory mounting system, shown connected with the accessory mount.

Referring now to FIGS. 14-16, the second adapter bracket 14 is configured to mount to the vehicle 1 at least one second accessory $A_2$ that is preferably formed as a generally rectangular cooler 170. The second bracket 14 preferably includes at least one and preferably two bracket mounting apertures 35A, 35B (described above) and two opposing engagement or "latching" surfaces 38 spaced from the bracket apertures 35A, 35B. As with the first bracket 12, the bracket apertures 35A, 35B of the second bracket 14 are each alignable with a separate one of the mount connective apertures 25A, 25B. As such, a fastener F is extendable through the two aligned apertures 25A/35A and 25B/35B so as to releasably connect the second adapter bracket 14 with the mount 16. Further, the two latching surfaces 38 are each frictionally engageable by a separate one of two tabs 172 of the second accessory A$_2$, as described below, so as to connect the accessory A$_2$ with the second bracket 14.

Preferably, the second adapter bracket 14 includes a generally L-shaped plate 174, with the bracket apertures 35A, 35A extending into the plate 174 and the two engagement surfaces 38 being provided on the plate 174. More specifically, the bracket plate 174 includes a first, generally vertical plate section 175 providing the apertures 35A, 35A and a second, generally horizontal plate section 176 extending perpendicularly with respect to the plate first section 175. The plate second section 176 has opposing edge sections 177 each providing a separate one of the two engagement surfaces 38, and preferably has a support surface 178 configured to support the preferred cooler 170 or other second accessory A$_2$. Preferably, the plate second section 176 also further includes a plurality of seating openings 180 each configured to receive a separate projection 182 extending from a lower surface 171 of the preferred cooler 170, so as to thereby position or "seat" the cooler 170 onto the bracket support surface 178. Furthermore, the plate sections 174, 176 are sized such that when the second bracket 14 is connected with the accessory mount 30, the plate second section 176 is generally disposed upon the vehicle body platform surface 160. As such, the vehicle body 3 provides additional support for the second bracket 14 and any accessory A$_2$ mounted thereon.

As best shown in FIG. 15, the preferred cooler 170 or other second accessory A$_2$ preferably has one latch tab 172 formed as a inwardly bended rectangular tab 184 that "hooks" about a proximal one of the plate edge section 177. The other latch tab 172 is preferably provided by a cantilever section 186 of a plate 188 attached to the bottom of the cooler 170. The cantilever plate section 186 is hingedly connected with a remainder of the plate 188 so as to be pivotable to frictionally engage with, and alternatively disengage from, a proximal one of the bracket plate edge sections 177. Thus, the engagement of the two accessory tabs 170 with the bracket engagement surfaces 38 provides a latching mechanism for relatively quick mounting and demounting of the cooler 170 to and from the second bracket 14. Although such a latching mechanism is presently preferred, each second accessory A$_2$ may be connected with the second adapter bracket 14 by any other appropriate means (e.g., fasteners, clamps, bayonet connections, etc.)

Referring to FIGS. 17-21, the third adapter bracket 18 is configured to mount to the vehicle 1 at least one third accessory A$_3$ that includes a wedge-shaped or "bayonet" portion 192 disposeable within a mating opening or aperture 39 in the bracket 18, as described above and in further detail below. As with the first and second brackets 12, 14, the third bracket 18 preferably includes at least one and preferably two bracket mounting apertures 35A, 35B (described above) each alignable with a separate one of the mount connective apertures 25A, 25B. Two fasteners F are each extendable through one of the two aligned aperture pairs 25A/35A and 25B/35B so as to releasably connect the third bracket 18 with the mount 16.

Preferably, the third bracket 18 includes a body 195 with a pair of spaced apart, generally facing engagement surfaces 196A, 196B extending generally vertically within the body 195 and at least partially defining the accessory engagement aperture 39. The two surfaces 196A, 196B are configured to frictionally engage with the accessory bayonet portion 192 so as to releasably connect the accessory A$_3$ with the bracket 18. Further, the bracket body 195 preferably includes a generally rectangular box 197 having a generally hollow interior 197a and two spaced apart, generally vertically extending wall sections 198. Each wall section 198 provides a separate one of the two bracket engagement surfaces 196A, 196B.

Most preferably, the third adapter bracket 18 is preferably formed as a V bracket 200 having a front end 201 that faces outwardly from the vehicle 1 and a rear end 203 positionable against the side wall 54 when mounted to the vehicle 1. The V bracket 200 has a top end 202 including a rear upwardly extending portion 206 and a bottom end 204 including a rear downwardly extending portion 208 providing a bracket engagement portion P$_B$ disposeable within the mount slotted opening 24, as described above. The top upwardly extending portion 206 has a generally rectangular shape with rounded edges and includes two counterbore holes 210 each providing one of the two bracket apertures 35A, 35B, as discussed above and in further detail below. The downwardly extending portion 208 preferably includes a two protrusions or tabs 209 disposeable within the preferred elongated recess 82 of the accessory mount 16. Preferably, the bracket upwardly extending portion 206 and downwardly extending portion 208 are both generally flush with the rear end 203 of the V bracket 200.

The counterbore holes 210 in the bracket upwardly extending portion 206 are preferably configured similarly to the holes 112 of the T bracket 100 described above. Specifically, as best shown in FIG. 19, the counter bore holes 210 each include a larger diameter hole section 210b that is separated from a smaller diameter hole section 210a by a washer-type element 218. Such an aperture configuration allows fasteners F to be inserted into each counter bore hole 210 and an aligned mount aperture 22, and a head portion of such a fastener F to be seated in counter bore hole 210b adjacent the washer-type element 218. Alternatively, the V bracket 200 may have bracket apertures 35A, 35B formed as generally constant diameter through holes (not shown) or may instead include fasteners (none shown), integral or otherwise, that are insertable into the connective apertures 22 in lieu of the counter bore holes 210.

Preferably, the counterbore holes 210 are located at opposite horizontal ends of the upwardly extending portion 206. However, the holes 210 may be located at any position along this upwardly extending portion 206 and/or the bracket upwardly extending portion 206 may take any shape necessary as long as the counter bore holes 210 in the V bracket 200 are positioned to correspond with the apertures 22. The counter bore holes 210, similarly, may have any shape necessary as long as a fastener to be used with the V bracket fits either within the counter bore hole 210 or within counter bore holes 210a and 210b. Further, the upwardly extending portion 206 of the V bracket 200 also includes a substantially straight portion 220 extending between the counterbore holes 210 that serves to connect the two holes 210, which may have any appropriate shape.

Further, the V bracket 200 also preferably includes side and front walls 212, 214, respectively, forming the box 197 and at least partially defining a recess or hollow interior 216 having a generally three-dimensional V shape, the interior 216 providing the engagement aperture 39 as discussed above. The hollow interior 216 is shaped to engage in a positive-negative relationship with mating structures on an accessory A$_3$. Preferably, the bracket side walls 212 each have a generally rectangular shape and the front walls 214 each have a generally trapezoidal shape and an edge 215, the two edges 215 forming a frontward opening into the hollow interior 216. Further, the hollow interior 216 provides a mounting structure engageable in a positive-negative relationship with mating structures on an accessory A$_3$, as discussed below. In addition to the side and front walls 212 and 214, the hollow interior 216 is also formed from slanted interior walls 218 that form the internal, three-dimensional V shape and provide the friction engagement surfaces 196A, 196B, as described above. Further, the bracket hollow interior 216 has an upwardly opened end 222 and a closed end 224. The upwardly opened end 222 has a generally rectangular shape and is formed by a top edge 217 of the side walls 212 and front walls 214. The closed end 224 also has a generally rectangular shape and is formed by the bottom end 204 of the V bracket 200 and further defined by bottom ends of the interior slanted walls 218 and opposing edges 215 of the front walls 214. The hollow interior 216 therefore extends from the top end 217 to the V bracket bottom end 204.

Referring to FIGS. 20 and 21, one accessory $A_3$ that may be used with the V bracket 200 is a sand bucket 250, although a variety of accessories $A_3$ may alternatively be mounted, alone or in combination, to the V bracket 200. Preferably, the body platform surface 160 of the vehicle 1 is shown in FIG. 20 as providing additional underlying support to the sand bucket 250 as described above with regard to the basket 134. As best shown in FIG. 21, the sand bucket 250 preferably has a bayonet mounting portion 252 configured to mate in a positive-negative relationship with the engagement aperture 39 of the third adapter bracket 18. The mounting structure 252 has a generally trapezoidal rearwardly facing portion 254 with a generally T-shaped cross-section such that a rearwardly facing portion 254 of the mounting structure 252 is seated within the hollow interior 216. Further, the bucket mounting structure 252 is substantially vertically extending and has a height that corresponds to at least the height from the top end 217 to the bottom end 204 of the hollow interior 216. The generally T-shaped cross-section is wider at the top of the mounting structure 252 than at the bottom, thereby producing a tapered and generally trapezoidal appearance. The rearwardly facing portion 254 includes outwardly extending portions 256 that form the horizontal portion of the "T" in the T-shaped cross-section. The outwardly extending portions 256 engage with and/or fit adjacent the interior slanted walls 218 of the V bracket 200. The medial portion 258 forming the vertical portion of the "T" in the T-shaped cross-section is dimensioned to fit adjacent the edges 215 on the V bracket 200 that form a frontward opening to the hollow interior 216. Although the above described bayonet mounting arrangement is preferred, the third adapter bracket 18 may have any other structure for connectably engaging with one or more third accessories $A_3$.

The universal accessory mounting system 10 of the present invention provides a modular arrangement for mounting a variety of different accessories $A_n$ and for easily removing and replacing one accessory $A_n$ with a different accessory $A_n$. For example, the first adapter bracket 12 may be mounted on one side (e.g., driver side 1c) of the vehicle 1, while the second adapter bracket 14 is mounted on an opposite side (i.e., passenger side 1d) of the vehicle 1. Once the first bracket 12 has been mounted to the vehicle 1, the universal accessory mount 16 is adapted for use with a variety of different first accessories $A_1$, or a combination of accessories $A_1$ as explained above. Similarly, when either one of the second or third brackets 14, 18 is mounted to the vehicle 1, a variety or combination of other accessories $A_2$, $A_3$ is alternatively mountable to the vehicle 1. Whether an accessory $A_n$ is mounted to the universal accessory mount 16 directly or by means of an adapter bracket 12, 14 or 18, the accessory $A_n$ may be easily be removed therefrom by first releasing a fastener F or portion of the accessory $A_n$ from engagement with either the apertures 22 or 37, the latching surfaces 38, or the engagement aperture 39. The accessory $A_n$ may then be removed from engagement with the slotted retainer opening 26, i.e., if a portion thereof is disposed within the preferred elongate recess 82. Thereafter, the accessory $A_n$ may be then removed from the vehicle 1. A different accessory $A_n$ may then be connected with the universal accessory mount 16 either directly or by means of the appropriate bracket 12, 14 or 18.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A golf accessory for attaching to an accessory mounting system of a golf car, the accessory mounting system including a bracket configured to connectably receive the golf accessory, a mount for attachment to the golf car and configured to connectably receive the bracket, the mount including a base that has a generally vertical surface, an aperture extending generally horizontally into the base from the vertical surface and configured to receive a portion of a fastener coupled with the bracket, and a slotted opening extending into the base and configured to receive a portion of the bracket, wherein the base includes a generally horizontal surface and the slotted opening extends generally vertically into the base from the horizontal surface, the golf accessory comprising:
 a golf-related item;
 means for connecting the golf-related item to the bracket including a first latching tab and a second latching tab that frictionally engage a plate of the bracket; and
 a mounting plate,
 wherein the first latching tab is coupled to a proximal end of the mounting plate and the second mounting tab is coupled to a distal end of the mounting plate,
 wherein the proximal end and distal end of the mounting plate align with proximal and distal ends of the plate of the bracket such that the first latching tab engages the proximal end of the plate of the bracket and the second latching tab engages the distal end of the plate of the bracket,
 wherein the first latching tab is substantially rigid with respect to the mounting plate and hooks around the plate of the bracket, and
 wherein the second latching tab is at least partially pivotable with respect to the mounting plate such that when the first latching tab is hooked about the plate of the bracket, the second latching tab can frictionally engage the plate of the bracket to substantially secure the golf accessory to the plate of the bracket.

2. The golf accessory of claim 1, wherein the means for connecting frictionally engage the bracket.

3. The golf accessory of claim 1, wherein the golf-related item is a sand bottle.

4. The golf accessory of claim 1, wherein the golf-related item is a container.

5. The golf accessory of claim 1, wherein the golf-related item is a golf equipment washer.

6. The golf accessory of claim 1, wherein the golf-related item is a cooler.

7. A golf accessory assembly for use with a golf car, the golf car including a mount including a base that has a generally vertical surface, an aperture extending generally horizontally into the base from the vertical surface, and a slotted opening extending into the base, wherein the base includes a generally horizontal surface and the slotted opening extends generally vertically into the base from the horizontal surface, the golf accessory assembly comprising:
- a bracket adapted for connection to the mount of the golf car;
- a container for holding a golf accessory, at least a portion of the golf accessory disposed within the container; and
- means for connecting the container to the bracket;
- wherein the bracket includes an engagement aperture with a generally trapezoidal profile, and the container includes a generally trapezoidal rearwardly facing portion with a generally T-shaped cross-section received within the engagement aperture of the bracket.

8. The golf accessory assembly of claim 7, wherein the container is one of a sand bottle container, a basket, a cooler, a golf equipment washer, and a sandbucket.

9. A golf accessory for attaching to an accessory mounting system of a golf car, the accessory mounting system including a bracket configured to connectably receive the golf accessory, a mount for attachment to the golf car and configured to connectably receive the bracket, the mount including a base that has a generally vertical surface, an aperture extending generally horizontally into the base from the vertical surface and configured to receive a portion of a fastener coupled with the bracket, and a slotted opening extending into the base and configured to receive a portion of the bracket, wherein the base includes a generally horizontal surface and the slotted opening extends generally vertically into the base from the horizontal surface, the golf accessory comprising:
- a golf-related item;
- means for connecting the golf-related item to the bracket including a first latching tab and a second latching tab that frictionally engage a plate of the bracket; and
- a mounting plate,
- wherein the first latching tab is coupled to a proximal end of the mounting plate and the second mounting tab is coupled to a distal end of the mounting plate,
- wherein the proximal end and distal end of the mounting plate align with proximal and distal ends of the plate of the bracket such that the first latching tab engages the proximal end of the plate of the bracket and the second latching tab engages the distal end of the plate of the bracket,
- wherein the mounting plate defines a horizontal surface and the first latching tab and the second latching tab extend downward from the horizontal surface, and the plate of the bracket is horizontally disposed such that the mounting plate rests on the plate of the bracket and the first latching tab and the second latching tab engage the plate of the bracket and extend below a lower surface of the plate of the bracket.

10. The golf accessory of claim 9, wherein the means for connecting frictionally engage the bracket.

11. The golf accessory of claim 9, wherein the golf-related item is a sand bottle.

12. The golf accessory of claim 9, wherein the golf-related item is a container.

13. The golf accessory of claim 9, wherein the golf-related item is a golf equipment washer.

14. The golf accessory of claim 9, wherein the golf-related item is a cooler.

15. A golf accessory for attaching to an accessory mounting system of a golf car, the accessory mounting system including a bracket configured to connectably receive the golf accessory, a mount for attachment to the golf car and configured to connectably receive the bracket, the mount including a base that has a generally vertical surface, an aperture extending generally horizontally into the base from the vertical surface and configured to receive a portion of a fastener coupled with the bracket, and a slotted opening extending into the base and configured to receive a portion of the bracket, wherein the base includes a generally horizontal surface and the slotted opening extends generally vertically into the base from the horizontal surface, the golf accessory comprising:
- a golf-related item; and
- means for connecting the golf-related item to the bracket;
- wherein the means for connecting includes a connection that engages an engagement aperture of the bracket, the connection has a generally trapezoidal rearwardly facing portion with a generally T-shaped cross-section such that the connection is received within a hollow interior of the engagement aperture of the bracket.

16. The golf accessory of claim 15, wherein the golf accessory defines a height and the connection extends along substantially the entire height.

17. The golf accessory of claim 15, wherein the means for connecting frictionally engage the bracket.

18. The golf accessory of claim 15, wherein the golf-related item is a sand bottle.

19. The golf accessory of claim 15, wherein the golf-related item is a container.

20. The golf accessory of claim 15, wherein the golf-related item is a golf equipment washer.

21. The golf accessory of claim 15, wherein the golf-related item is a cooler.

\* \* \* \* \*